(12) United States Patent
Kim

(10) Patent No.: US 9,342,391 B2
(45) Date of Patent: *May 17, 2016

(54) COORDINATED AND DEVICE-DISTRIBUTED DETECTION OF ABNORMAL NETWORK DEVICE OPERATION

(71) Applicant: Belkin International, Inc., Playa Vista, CA (US)

(72) Inventor: Ryan Yong Kim, Rolling Hills Estates, CA (US)

(73) Assignee: Belkin International Inc., Play Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/677,744

(22) Filed: Apr. 2, 2015

(65) Prior Publication Data

US 2016/0072832 A1 Mar. 10, 2016

Related U.S. Application Data

(63) Continuation of application No. 14/480,878, filed on Sep. 9, 2014, now Pat. No. 9,026,840, and a continuation of application No. 14/481,617, filed on Sep. 9, 2014, now Pat. No. 9,026,841, which is a continuation of application No. 14/480,878, filed on Sep. 9, 2014, now Pat. No. 9,026,840.

(51) Int. Cl.
*G06F 11/00* (2006.01)
*G06F 11/07* (2006.01)
*H04L 29/06* (2006.01)

(52) U.S. Cl.
CPC ........ *G06F 11/0709* (2013.01); *H04L 63/1425* (2013.01)

(58) Field of Classification Search
CPC .................... G06F 11/0709; G06F 11/3055
See application file for complete search history.

(56) References Cited

U.S. PATENT DOCUMENTS

| 7,269,762 B2 * | 9/2007 | Heckmann | B60T 8/885 |
| | | | 701/31.4 |
| 8,176,208 B2 * | 5/2012 | Shishido | G06F 11/0727 |
| | | | 710/3 |

(Continued)

FOREIGN PATENT DOCUMENTS

| EP | 2 293 513 A1 | 3/2011 |
| EP | 2 723 034 A1 | 4/2014 |
| WO | 2010/124799 A1 | 11/2010 |
| WO | 2014/090740 A1 | 6/2014 |

OTHER PUBLICATIONS

First-Action Interview Pilot Program Pre-Interview Communication for U.S. Appl. No. 14/480,878, mailed Nov. 26, 2014, 5 pages.

(Continued)

*Primary Examiner* — Michael Maskulinski
(74) *Attorney, Agent, or Firm* — Kilpatrick Townsend & Stockton LLP

(57) ABSTRACT

Techniques for coordinated and device-distributed detection of abnormal network device operation are provided. In some embodiments, a method may include identifying a suspicious activity condition associated with a suspect network device. The suspicious activity condition may also be associated with the device itself. Activity of the network device may be detected and analyzed, including additional data corresponding to the activity from one or more other network devices in the same network. In response to determining that the suspicious activity condition is satisfied, an alert communication can be transmitted that identifies the suspect network device. When the activity is associated with the device itself, a local operation at the network device may be changed.

29 Claims, 20 Drawing Sheets

(56) References Cited

U.S. PATENT DOCUMENTS

| | | | |
|---|---|---|---|
| 8,386,113 B2 | 2/2013 | Preston | |
| 9,026,840 B1 | 5/2015 | Kim | |
| 9,026,841 B1 | 5/2015 | Kim | |
| 9,164,824 B2* | 10/2015 | Harada | G06F 11/0784 |
| 2009/0040934 A1* | 2/2009 | Matsubara | G05B 23/0237 |
| | | | 370/242 |
| 2013/0039166 A1 | 2/2013 | Brown et al. | |
| 2013/0155902 A1 | 6/2013 | Feng et al. | |
| 2014/0156832 A1 | 6/2014 | Stanko et al. | |
| 2014/0181012 A1* | 6/2014 | Min | G06F 11/1464 |
| | | | 707/610 |
| 2014/0222892 A1* | 8/2014 | Lee | H04L 67/10 |
| | | | 709/203 |

OTHER PUBLICATIONS

First-Action Interview Pilot Program Pre-Interview Communication for U.S. Appl. No. 14/481,617, mailed Dec. 11, 2014, 5 pages.
Notice of Allowance for U.S. Appl. No. 14/480,878, mailed Jan. 30, 2015, 11 pages.
Notice of Allowance for U.S. Appl. No. 14/481,617, mailed Jan. 30, 2015, 8 pages.
International Search Report and Written Opinion of the International Searching Authority for PCT Application No. PCT/US2015/040138 mailed Oct. 21, 2015, 11 pages.

* cited by examiner

COORDINATED AND DEVICE-DISTRIBUTED DETECTION OF ABNORMAL NETWORK DEVICE OPERATION

CROSS-REFERENCE TO RELATED APPLICATIONS

This application is a continuation of U.S. application Ser. No. 14/480,878, filed on Sep. 9, 2014. This application is also a continuation of U.S. application Ser. No. 14/481,617, filed on Sep. 9, 2014, which is a continuation of U.S. application Ser. No. 14/480,878, filed on Sep. 9, 2014. Each of these applications is hereby incorporated by reference in its entirety for all purposes.

TECHNICAL FIELD

The present disclosure relates to network devices and, specifically, coordinated and device-distributed detection of abnormal network device operation.

BACKGROUND

Network devices (e.g., outlets, switches, and the like) perform various operations within a network environment. For example, two lamps may be plugged into two outlet network devices in a living room. Each outlet may provide power to the corresponding lamp, so that the lamp can provide light to the living room. However, when one lamp begins to flicker, the user often needs to intervene to determine what is causing the abnormal operation. When both lamps flicker, the user may perform different problem solving steps to try to determine what is wrong with living room as a whole (e.g., light storm, power surge, etc.). The network device may be unable to identify, let alone resolve, such an abnormal operation.

BRIEF SUMMARY

Techniques are described for coordinated and device-distributed detection of abnormal network device operation. In some embodiments, a computer-implemented method for using corresponding detection data from multiple distributed network devices to detect suspicious network device activity may be provided. The method may include identifying, by an evaluating network device, a suspicious activity condition. The evaluation of the condition can include evaluating data from each of a plurality of network devices that corresponds to a suspect network device. An activity of the suspect network device may be detected at the evaluating network device. The evaluating network device and suspect network device may be part of a same network. A communication may be received at the evaluating network device and from each of one or more other network devices. The communication can include data corresponding to the suspect network device. The evaluating network device and the one or more other network devices may be part of the same network. At the evaluating network device, the suspicious activity condition may be determined to be satisfied based on the data corresponding to the suspect network device from each of the one or more other network devices and the detected activity. In response to the determining that the suspicious activity condition is satisfied, an alert communication may be transmitted. The alert can identify the suspect network device and correspond with an indication that the suspicious activity condition has been satisfied.

In some embodiments, a system may be provided. The system may include one or more data processors and a non-transitory computer-readable storage medium containing instructions which when executed on the one or more data processors, cause the one or more processors to perform actions including identifying a suspicious activity condition. The evaluation of the condition includes evaluating data from each of a plurality of network devices that corresponds to a suspect network device. An activity of the suspect network device may be detected. The evaluating network device and suspect network device may be part of a same network. A communication may be received from each of one or more other network devices. The communication can include data corresponding to the suspect network device. The system and the one or more other network devices may be part of the same network. The suspicious activity condition may be determined to be satisfied based on the data corresponding to the suspect network device from each of the one or more other network devices and the detected activity. In response to the determining that the suspicious activity condition is satisfied, an alert communication may be transmitted that identifies the suspect network device and corresponds to an indication that the suspicious activity condition has been satisfied.

In some embodiments, a computer-program product tangibly embodied in a non-transitory machine-readable storage medium may be provided. The computer-program product may include instructions configured to cause a data processing apparatus of an evaluating network device to perform actions including identifying a suspicious activity condition. The evaluation of the condition may include evaluating data from each of a plurality of network devices that corresponds to a suspect network device. Activity of the suspect network device may be detected. The evaluating network device and suspect network device may be part of a same network. A communication may be received from each of one or more other network devices. The communication may include data corresponding to the suspect network device. The evaluating network device and the one or more other network devices may be part of the same network. The suspicious activity condition may be determined to be satisfied based on the data corresponding to the suspect network device from each of the one or more other network devices and the detected activity. In response to the determining that the suspicious activity condition is satisfied, an alert communication may be transmitted. The alert communication can identify the suspect network device and corresponds to an indication that the suspicious activity condition has been satisfied.

Techniques are also described for coordinated and device-distributed detection of abnormal network device operation. In some embodiments, a computer-implemented method for using corresponding detection data from multiple distributed network devices to detect suspicious network device activity may be provided. The method may include identifying, at a network device, a suspicious activity condition. The evaluation of the condition can include evaluating data from each of a plurality of network devices that corresponds to the network device. The activity of the network device associated with the suspicious activity condition can be detected at the network device. A communication can be received at the network device and from each of one or more other network devices. The communication can include data corresponding to the activity of the network device. The network device and the one or more other network devices may be part of the same network. The suspicious activity condition may be determined to be satisfied at the network device. The determination may be based on data corresponding to the network device from each of the one or more other network devices and the detected activity. In response to the determining that the suspicious activity condition is satisfied, a local operation of the network device may be changed.

In some embodiments, a system may be provided. The system may include one or more data processors and a non-transitory computer-readable storage medium containing instructions which when executed on the one or more data processors, cause the one or more processors to perform actions including identifying a suspicious activity condition. The evaluation of the condition can include evaluating data from each of a plurality of network devices that corresponds to the system. The activity of the system associated with the suspicious activity condition can be detected. A communication from each of one or more network devices can be received. The communication can include data corresponding to the activity of the network device. The system and the one or more network devices are part of the same network. The suspicious activity condition may be determined to be satisfied based on the data corresponding to the system from each of the one or more network devices and the detected activity. In response to the determining that the suspicious activity condition is satisfied, a local operation of the system may be changed.

In some embodiments, a computer-program product tangibly embodied in a non-transitory machine-readable storage medium may be provided. The computer-program product may include instructions configured to cause a data processing apparatus of an evaluating network device to perform actions including identifying a suspicious activity condition. The evaluation of the condition can include evaluating data from each of a plurality of network devices that corresponds to the network device. The activity of the network device associated with the suspicious activity condition may be detected. A communication can be received from each of one or more other network devices. The communication can include data corresponding to the activity of the network device. The network device and the one or more other network devices may be part of the same network. The suspicious activity condition may be determined to be satisfied based on the data corresponding to the network device from each of the one or more other network devices and the detected activity. In response to the determining that the suspicious activity condition is satisfied, a local operation of the network device can be changed.

BRIEF DESCRIPTION OF THE DRAWINGS

Illustrative embodiments of the present invention are described in detail below with reference to the following drawing figures.

DETAILED DESCRIPTION

Figure 1:
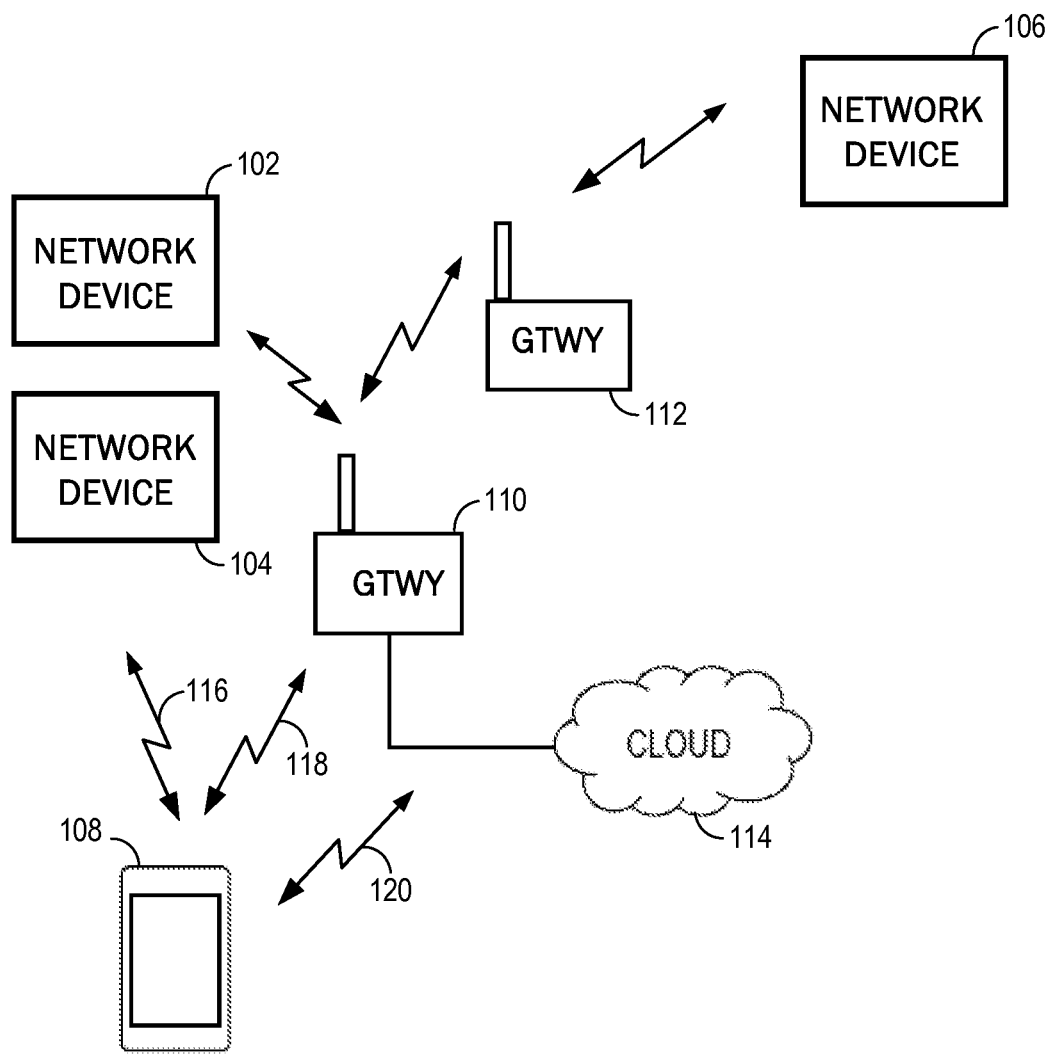
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network and/or a set of network devices located in a same building, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

As explained herein, techniques are provided that allow for coordinated and device-distributed detection of abnormal network device operation in the local area network, including when a network device detects an abnormal operation with another network device. When a network device in the local area network identifies a suspicious activity, the network device may become an evaluating network device. The evaluating network device may identify the suspect network device and receive additional data about the suspect network device from other network devices in the local area network. The evaluating network device can determine whether a particular suspicious activity condition or flag is satisfied). An alert may be transmitted that identifies the operational issue, which can help resolve the abnormal network device operation without user interaction.

Techniques are also provided that allow for coordinated and device-distributed detection of abnormal network device operation in the local area network, including when a network device detects an abnormal operation with itself. When a network device in the local area network identifies a suspicious activity, the network device may receive data from other network devices in the local area network. Based in part on the received data, the network device may determine that the abnormal operation does not correspond with any other network device in the local area network. The network device can then determine additional information (e.g., that a particular suspicious activity condition or flag is satisfied). A local operation at the network device may be changed, which can help resolve the abnormal network device operation without user interaction.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
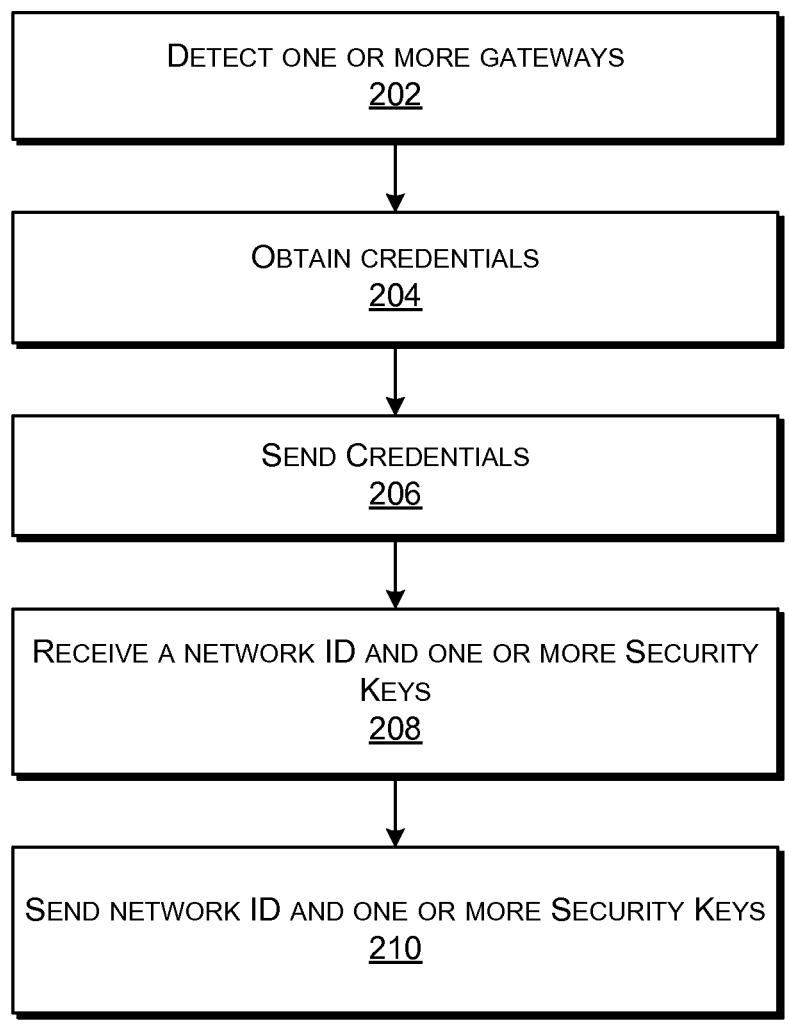
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64 (HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each network device, or individual storage tables for each local area network or other subset of its network devices/networks. In one embodiment, a change in status may prompt the-network device to push its change in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the network devices on the network 100. In other embodiments, one network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if network devices 102 and 104 were to each turn on and communicate their statuses to cloud network 114, cloud network 114 may analyze the status of network devices 102 and 104 and communicate to network devices 102 and 104 that they are each connected to the same local area network 100.

Figure 3:
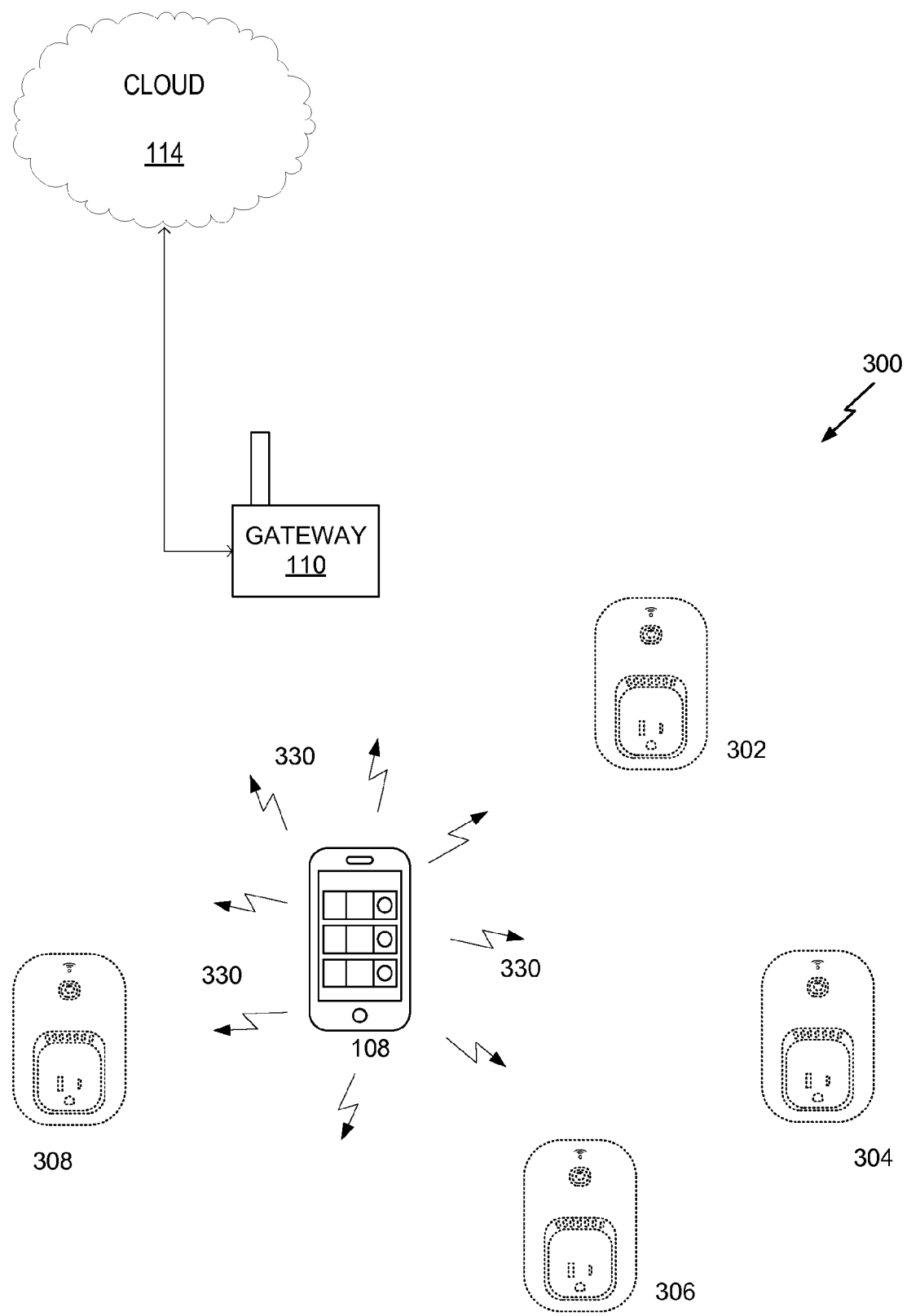
FIG. 3 is an illustration of an example of a network environment, in accordance with some embodiments.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
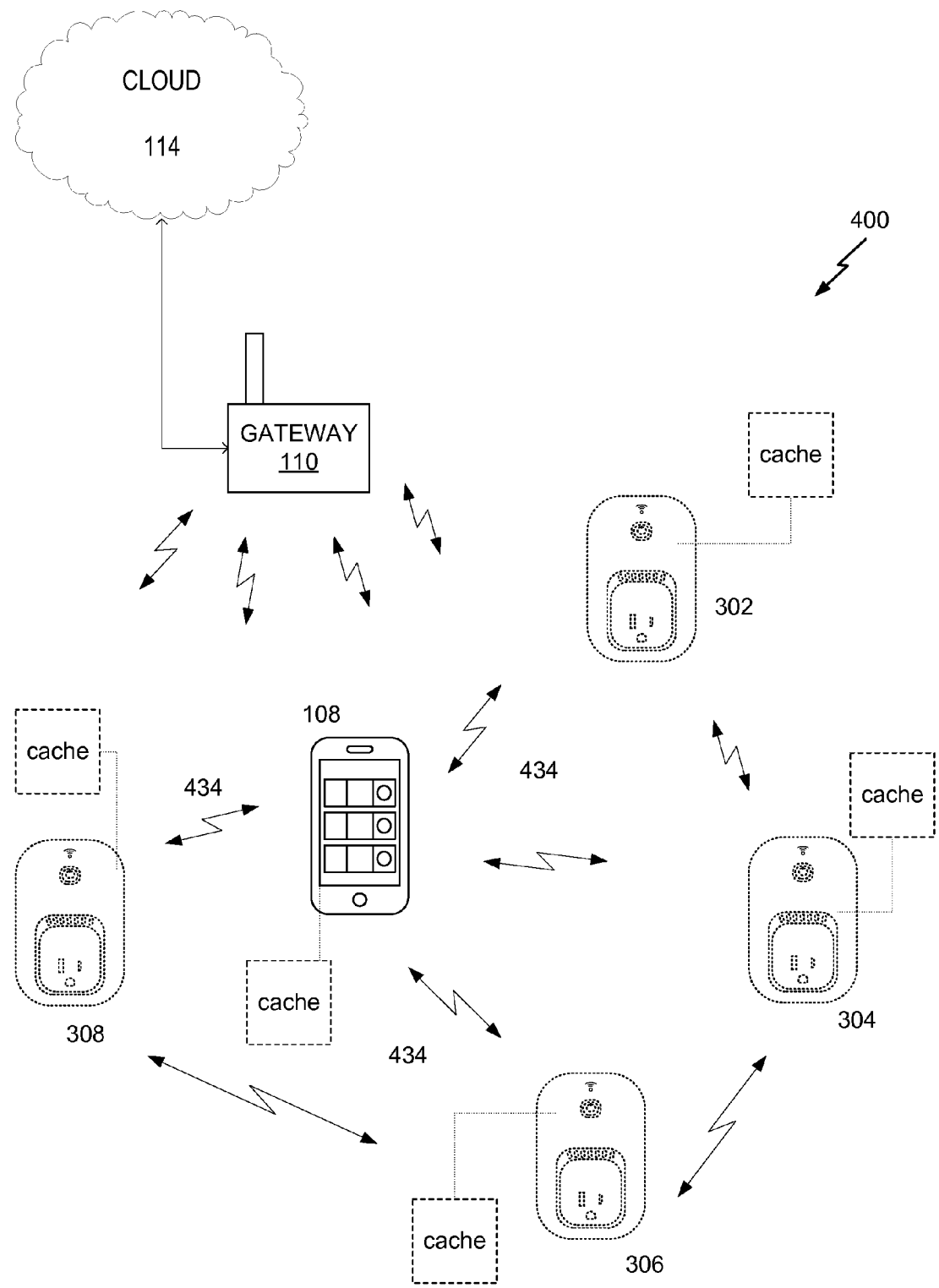
FIG. 4 is an illustration of an example of a network environment, in accordance with some embodiments.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
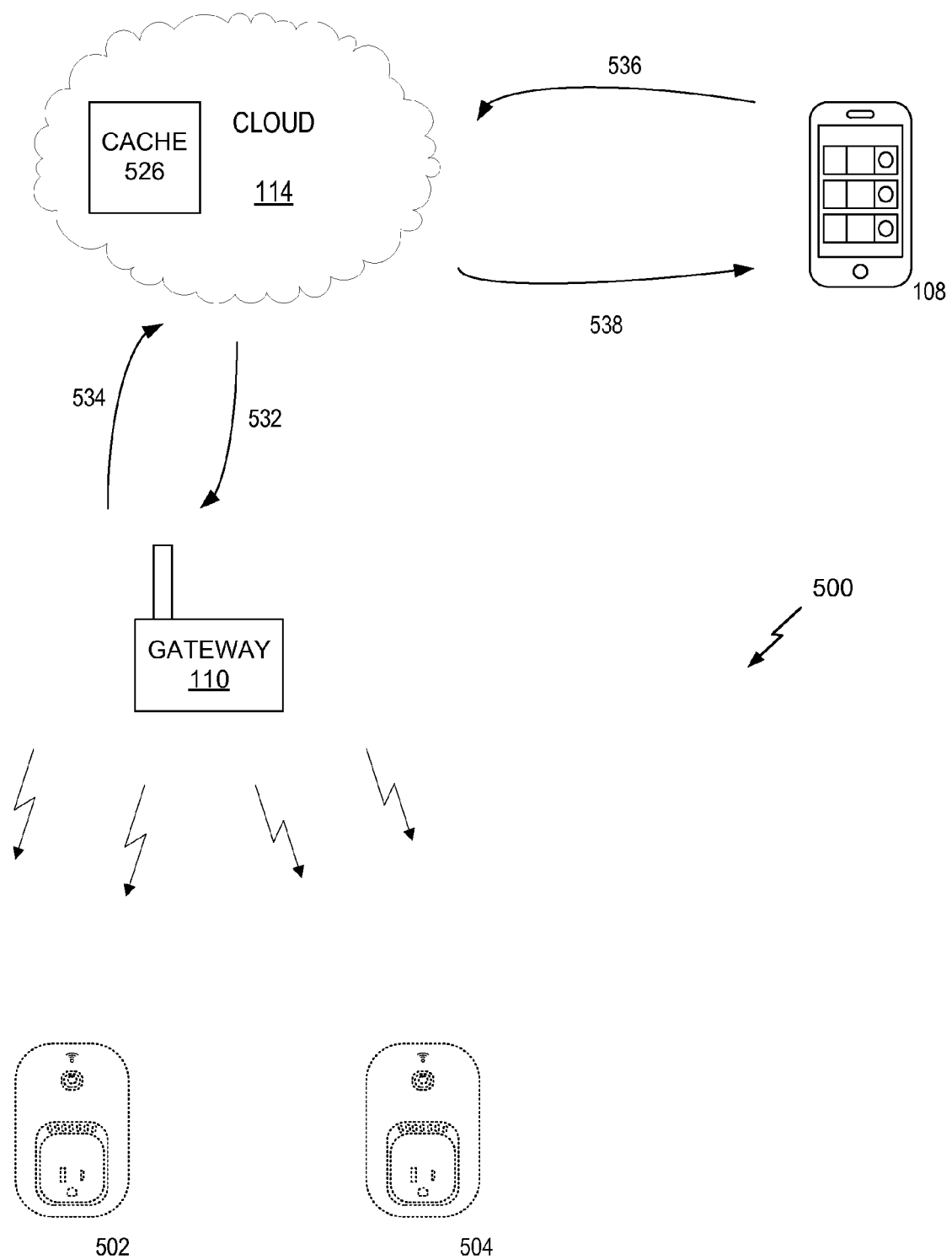
FIG. 5 is an illustration of an example of a network environment, in accordance with some embodiments.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Figure 6:
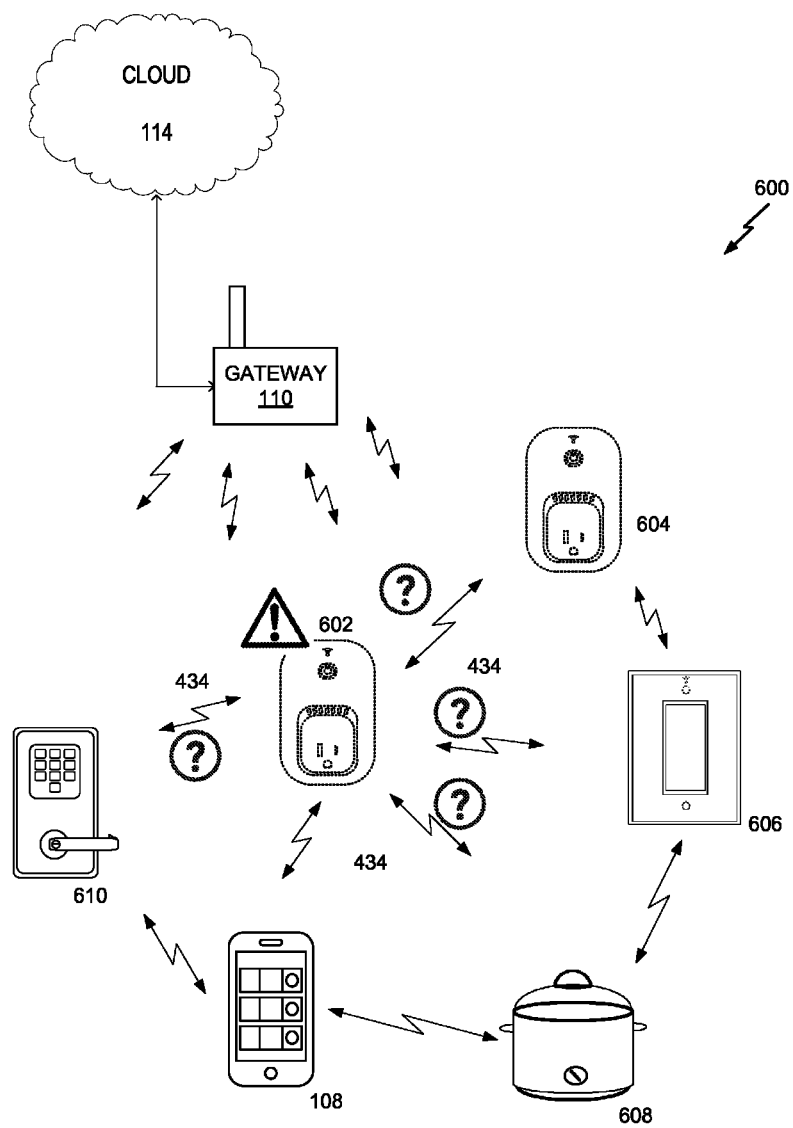
FIG. 6 is an illustration of an example of a network environment with coordinated and device-distributed detection of abnormal network device operation, in accordance with some embodiments.

FIG. 6 is an illustration of an example of a network environment with coordinated and device-distributed detection of abnormal network device operation, in accordance with some embodiments. Specifically, the network 600 can be a wireless local area network (e.g., a wired or wireless network, a local area network, and/or a network using a communication protocol, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like) enabling a network device to communicate with one or more other network devices and/or access device to convey a detection of an abnormal network device operation. Network 600 includes network devices 602, 604, 606, 608, and 610. It will be appreciated that, while FIG. 6 depicts example network devices (e.g., smart outlets, a light switch, a crockpot, a door lock, etc.), different embodiments can be extended to apply to other devices. As described herein, some example network devices can include, but not limited to, interior network devices (e.g., light switch, outlet, motion sensor, fan, garage door opener, sprinklers, heater, television, etc.), exterior motion sensors, exterior lighting (e.g., porch lights, walkway lights, security lights, etc.), garage door openers, sprinkler systems, or other network devices around a user's home, office, business or other location. The network 600 also includes access device 108, gateway 110, and cloud 114, or other devices, operations, and features described in association with FIGS. 1-5 (e.g., including network devices 102, 104, 106, etc.). In some embodiments, network 600 includes a set of network devices located in a same building.

In some embodiments, the network 600 may correspond with one or more suspicious activity conditions. For example, network device 602 may transmit a communication to the other network devices every 5 minutes to identify that network device 602 exists in the network 600. The communication can include an identifier and/or other information so that the other devices can confirm that the communication originates from network device 602. The series of communications may be a normal activity. When network device 602 does not transmit the communication, the absence of the activity may correspond with a suspicious activity. When the suspicious activity occurs, a suspicious activity condition may be satisfied.

A suspicious activity condition can be a threshold, Boolean expression (e.g., resulting in true, false, or null), process, technique (e.g., clustering technique where a cluster of data points associated with the clustering technique is either suspicious or normal, etc.), flowchart (e.g., whether the activity is suspicious or normal after a series of steps, etc.), or similar value that helps identify an abnormal operation (e.g., if suspicious activity condition is satisfied, then perform an action). Data may be evaluated in view of the suspicious activity condition. It should be appreciated that other implementations of the suspicious activity condition are permissible without diverting from the essence of the disclosure.

For example, the network device 602 detects that the power of the network device 604 is toggling on and off. A suspicious activity condition may be associated with this event (e.g., if "power toggles on an off," then perform some action). It will be appreciated that a variety of other detections and/or underlying events may be indicative of a suspicious activity as well. For example, the network device 602 may detect frequent communications from another network device in network 600 (e.g., corresponding to malware or device malfunction), loss of access to a network (e.g., Internet, the gateway 110, etc.), high temperature (e.g., corresponding to a fire, warm conditions, or device malfunction), water (e.g., corresponding to a flood or a water spill), high humidity (e.g., corresponding to a flood), non-responsiveness of a component of the device (e.g., corresponding to a malfunction of the device), toggling power of another network device in network 600, a power surge, and the like. As another example, gateway 110 can detect that device 602 is communicating with a new remote cloud IP address in a particular manner (e.g., that differs from a defined pattern that is globally defined, defined for a particular network or device type and/or defined based on past communications involving device 602). Such detection can include, e.g., detecting that a frequency of incoming and/or outgoing communications is above a threshold or that an average or median size of incoming and/or outgoing communications is above a threshold.

The suspicious activity condition can be identified through a variety of methods. In some embodiments, the network device 602 (or other network devices) can identify a suspicious activity condition with respect to a pattern of data. For example, a pattern of data can identify a threshold or range for a frequency of setting changes, sensor values, device operations, incoming communications and/or outgoing communications. To illustrate, for a house-security device, a pattern can indicate that it is typically activated four or fewer times per day. A suspicious activity condition can then be defined such that it is satisfied when the device is activated six or more times per day (e.g., to provide a buffer). As another illustration, for a lighting device, a pattern can indicate that it typically receives communications from a remote weather server (associated with a domain name and/or IP address) between 1-3 times per hour, and a suspicious activity condition can then be defined such that it is satisfied when the device receives more than 5 communications in an hour from the particular server, any server associated with the domain name or IP address or any server. As another illustration, a pattern can identify an upper and/or lower threshold for typical instantaneous power or changes thereto, and a suspicious activity condition can be defined such that it is satisfied when instantaneous power and/or changes thereto exceed the threshold (or a related threshold that includes an absolute or relative buffer).

In another illustrative example, network device 602 can identify the suspicious activity condition in association with transmitting data (e.g., if "transmitting more than 2 megabytes of data in 10 seconds," then do some action, or if "transmitting data to an unknown IP address," then do some action). Network device 602 can detect that network device 604 is transmitting megabytes of data to an unknown IP address (e.g., network device is hijacked or malware has been installed, etc.). The suspicious activity condition(s) may be satisfied because network device 604 is sending the data (e.g., which is over a threshold or counter to a standard activity pattern) and the data is being sent to an unknown IP address.

The suspicious activity condition can be associated with the device itself, another device, multiple devices in the network (e.g., a sub-network), or the network as a whole. For example, the suspicious activity condition can correspond with an activity associated with a suspect network device and an evaluating network device can identify the suspect network device's activities. In another example, the suspicious activity condition can correspond with an activity associated with the evaluating network device itself. As an illustration, network device 602 may detect that the connection to the Internet is no longer available (e.g., if "network unavailable," then perform some action). The network device 602 may have an issue internally that prevents network device 602 from connecting to the Internet (e.g., other network devices 604, 606, 608, and 610 can still connect to the Internet) or other devices may also experience the same connection issue. In some examples, the network device 602 may not know initially where the problem is, which suspicious activity condition is satisfied (e.g., there is a power outage, malware, a firewall, etc.), and/or how to respond.

In some embodiments, network device 602 may not be able to initially determine whether the source of the suspicious activity is from network device 604, or whether network device 604 is relaying the suspicious communication from some other network device (e.g., network device 606). In either example, the suspicious activity condition may still be identified (e.g., if "problem with network based on historical activity data for network" then perform some action).

After the suspicious activity condition is identified, the network device 602 may detect activity associated with the suspicious activity condition. For example, the detected activity may correspond with an operation corresponding with the suspicious activity condition (e.g., toggle state, frequent communications, etc.).

The network device 602 can detect activities and/or gather data associated with the suspicious activity with itself, as illustrated in FIG. 6. The network device 602 can also communicate with other devices in the network to detect activities and/or gather data associated with the suspicious activity, including the suspect network device, as illustrated in FIG. 7.

Figure 7:
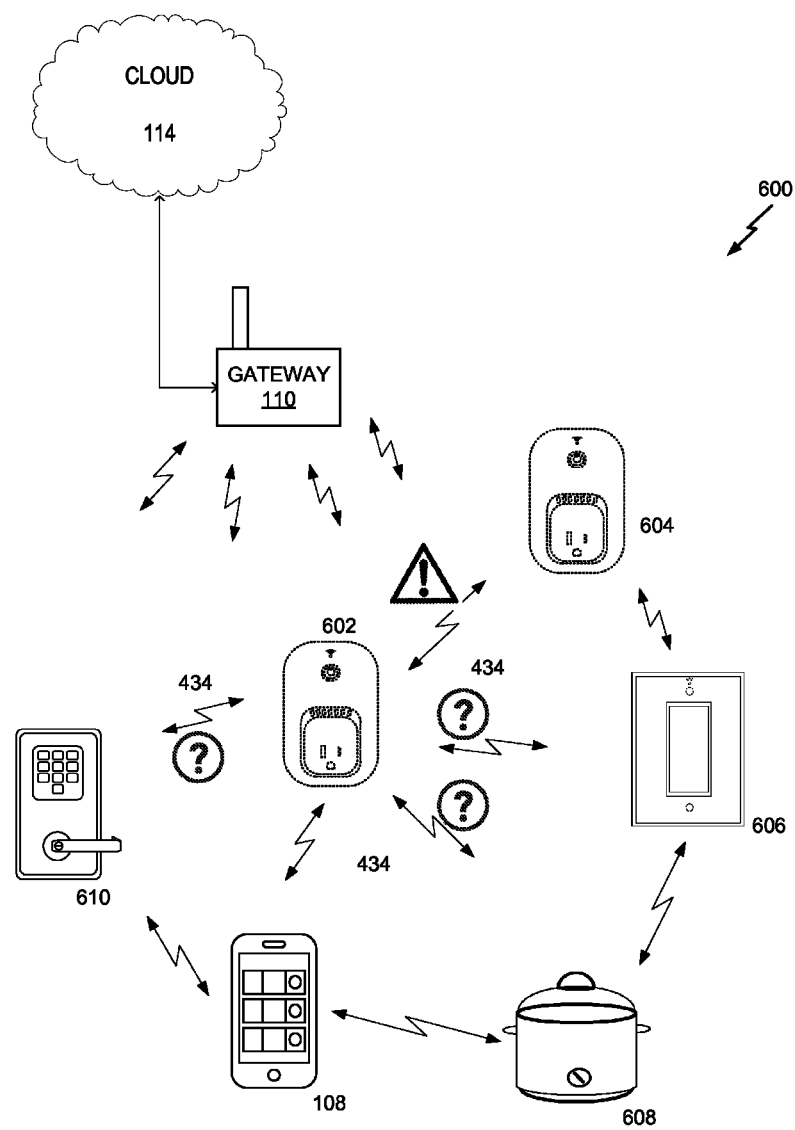
FIG. 7 is an illustration of an example of a network environment with coordinated and device-distributed detection of abnormal network device operation, in accordance with some embodiments.

FIG. 7 is an illustration of an example of a network environment with coordinated and device-distributed detection of abnormal network device operation, in accordance with some embodiments. As illustrated in FIG. 7, the evaluating network device may be network device 602 that receives a communication (or detects an activity, etc.) associated with network device 604. The communication or activity associated with network device 604 may be associated with a suspicious activity condition (e.g., if "frequent communications," then perform an action, or if "communication identifies a temperature spike," then perform an action, etc.). Network device 602 may also communicate with other network devices 606, 608, and 610 to determine whether these network devices are also receiving the abnormal communications from network device 604.

In one instance, network device 602 can actively communicate with network device 604 in a manner that checks to determine whether network device 604 is operating in accordance with a normal activity pattern and/or whether a suspicious activity condition is satisfied. Network device 604 can report (e.g., in a solicited or unsolicited manner) various characteristics of its operation to network device 602. For example, it can report details of incoming communications (e.g., source identifiers, times of receipt, frequency, communication content characteristics, any resulting actions, etc.), details of outgoing communications (e.g., destination identifiers, times of transmission, frequency, communication content characteristics, transmission triggers), setting changes, rule changes and so on. Such reporting can allow network device 602 to detect suspicious activity that network device

604 may not detect as being suspicious. For example, malware on device 604 may cause device 604 to improperly identify a remote device as a gateway device and may therefore determine that sending the remote device network-specific information is appropriate. Meanwhile, network device 602 may be spared of the malware and can therefore determine that the remote device is not authorized to receive such information and/or that no network device is to be communicating with a network-external device at a frequency above a threshold.

One or more communications that contain data may be received from the network devices 604, 606, 608, or 610 at network device 602. As illustrated in FIGS. 6-7, the network device 602 can evaluate data from one or more (e.g., each, one, some, etc.) of a plurality of network devices. The data may include data received by the network devices (e.g., communications), data generated by the network devices (e.g., activity logs of operations by other network devices in the local area network), or other data. In some examples, the data may be received through routine transmissions (e.g., communications that are transmitted every 5 minutes without requesting the communication, etc.) and/or requested from the network devices. In some embodiments, the data is transmitted to an evaluating network device after a local condition is satisfied (e.g., network device 606 detects an abnormal operation with network device 604, so network device 606 automatically transmits data to network device 602 for evaluation). The data may be requested from the network devices when a local condition is satisfied as well (e.g., network device 602 detects an abnormal operation with network device 604, so network device 602 requests data about network device 604 from the other network devices).

The communication(s) can include data corresponding to the activity of the network device. For example, the activity may include an activity log or other historical data that identifies the activities of the network device. In some examples, the communication includes data to identify whether the suspicious activity condition has been satisfied. In some examples, the data may be received through routine transmissions, requested from the network devices, transmitted to an evaluating network device after a local condition is satisfied at the transmitting network device, transmitted after a local condition is satisfied at the evaluating network device, or in response to or in anticipation of other operations.

The communication can include data identifying usage of the device. For example, the data may correspond to user input received at or controlling operation of the device, one or more current device settings or operations (e.g., a power state and/or intensity), learned settings or patterns, readings of sensors at or associated with the device (or processed versions thereof), and/or performance indicators of the device or of one or more components of the device. For example, data may include an existing rule that affects the operation of the network device. The rule can be based on user input that identifies a condition (e.g., a time of day, motion detection, or switch configuration) and a device operation (e.g., a power state or setting). As another example, data may include a set of recent or current readings from one or more sensors (e.g., reflecting an environmental temperature and humidity). Data may correspond to a present time (e.g., reflecting a current device state) and/or to a past time or time period (e.g., reflecting an average sensor reading over a particular time period).

In some examples, the data corresponds with a time frame. For example, when the network device 602 communicates with network device 604, the expected time to respond may be 1-second (e.g., based on a threshold, based on a predetermined value, based on a historical activity pattern, etc.). When the network device 604 responds in 2-seconds (e.g., over several communications in 1 day, in a single communication, etc.), the network device 602 can detect an activity associated with the suspicious activity condition. In another example, if network device 602 takes 2-seconds to generate a communication to network device 604, network device 602 can detect a suspicious activity with itself.

In some examples, the network devices 602, 604, 606, 608, and 610 may constantly transmit communications to indicate to other devices that they are present (e.g., every 5 seconds, every minute, every 5 minutes, etc.) and the presence or absence of the communication may be the data (e.g., instead of the content of the communication). The communication may be a type of site survey or beacon (e.g., including a network identifier like a service set identification (SSID) of the home local area network, a media access control (MAC) address of the gateway, and/or the like).

In some examples, the gateway 110 or cloud 114 may evaluate the data. For example, the gateway 110 or cloud 114 may receive data corresponding to activities performed by the devices in network 600 and evaluate the data. The gateway 110 or cloud 114 can detect one or more activities of a single network device (e.g., showing a suspicious activity for the single device) or a plurality of devices (e.g., showing a suspicious activity for the network as a whole or a portion of the network). One or more of these detected activities may correspond with the suspicious activity condition.

In some instances, a device (e.g., network device 602, a gateway or cloud server) can receive and compare data from multiple devices to determine whether a suspicious activity condition is detected. For example, network device 602 can query each of multiple devices (e.g., network device 604 and gateway 110) for a number of packets that it transmitted to or received from the other device. When complementary numbers (e.g., a number of communications sent from gateway 110 to network device 604 in a time period and a number of communications received at network device 604 from gateway 110 within the time period) do not match, the evaluating device can determine that a suspicious activity condition is satisfied. Similarly, an evaluating device can query another device to request identification of a number of communications received at the other device from the evaluating device (or sent by the other device to the evaluating device) and determine that a suspicious activity condition is satisfied if it does not match a local tracking of a complementary number.

Collecting data from multiple devices can also aid in detecting abnormal behavior. A given activity pattern may itself be within a realm of normal operation, but if a similar pattern is detected across multiple devices in a network, it can be indicative of a problem. For example, communicating with an unfamiliar IP address may be allowable if a single device is doing so, though if multiple devices begin to communicate with the address, a responsive action may be triggered. Thus, in some instances, a suspicious activity condition involves assessment of multiple devices' operation. For example, a suspicious activity condition can indicate that it is satisfied when an activity parameters surpasses a threshold for each of at least a threshold number or percentage of devices in a network.

In some embodiments, the network devices may communicate through a standard network to receive the communications. For example, network device 602 may be associated with the suspicious activity (e.g., unable to receive or transmit communications to other network devices). Other network devices in network 600 may be used as a pass-through (e.g. node) to receive or transmit communications when network device 602 is unable. For example, if network device 602 is unable to transmit communications to other network devices, the network may rely on network device 604 to take its place (e.g., network device 604 transmits communications on behalf of network device 602). One or more of these network devices may also share data regarding its performance (e.g., success/failure to perform its tasks) with other devices on the network, gateway 110, cloud 114, other devices connected to the network device via the Internet, or other devices/networks.

In some examples, the network devices may communicate through a mesh network. For example, the communication may be transmitted along a different path (e.g., network device 606 to network device 604, instead of network device 606 to network device 602 to network device 604). The routing of the communication may hop from network device to network device (e.g., node to node) until the destination is reached. The routing of the communication may be reconfigured around broken or blocked paths using self-healing algorithms.

In some embodiments, the network devices may initiate an ad hoc network to communicate. The ad hoc network can include one or more network devices that are selected based on a situation and/or are part of a standard network. For example, a light switch network device may detect a suspicious activity (e.g., power toggling on and off), and form an ad hoc network with other network devices (e.g., those in the same room, within 10 feet of the light switch network device, in the same home or building, etc.).

In another example, the light switch network device may detect a suspicious activity (e.g., an Internet connection through the gateway 110 turned off an hour ago), and communicate with an initial set of network devices to determine if those network devices experienced the same suspicious activity during the same time frame (e.g., a random set, alphabetical set, the closest network device(s), etc.). If so, the ad hoc network can be formed with all of the other network devices that experienced the same suspicious activity during the same time frame identified in the initial communication. In another example, the light switch network device forms an ad hoc network with other network devices involved in a previous corresponding suspicious activity (e.g., having also detected the activity, having been a cause of the previous suspicious activity, etc.). The communications within the ad hoc network can transmit data (e.g., to determine the source of the activity, to confirm that the activity is not internal and experienced by other network devices, etc.).

After the ad hoc network is formed, the ad hoc network may be altered (e.g., iterative alterations, continuously, once, larger/smaller network, etc.). For example, a first ad hoc network can include all light switch network devices in a room. A second ad hoc network can include all light switch network devices and outlets in a room. A third ad hoc network can include all light switch network devices and outlets in a 5-foot radius. A fourth ad hoc network can include only one device (e.g., the suspect network device). Various factors may affect the alteration of the ad hoc network(s). For example, the alterations could include eliminating devices not detecting the activity and adding other devices based on which devices had detected the activity (e.g., adding more kitchen devices if a kitchen device detected the suspicious activity, adding more light switches if a light switch detected the suspicious activity, adding a gateway connected to a network device that detected the suspicious activity, etc.). It should be appreciated that any iteration of ad hoc network of one or more network devices is available without diverting from the essence of the disclosure. The iterative alterations of the ad hoc network can help determine the source of the suspicious activity, collect and analyze more relevant data (e.g., to determine if a suspicious activity condition is satisfied, etc.), and the like.

After the data is evaluated, the network device 602 may determine that the suspicious activity condition is satisfied. For example, the network device 602 can determine that the suspicious activity condition is satisfied based on the data corresponding to the network device from each of the one or more other network devices and the detected activity. In another example, the network device 602 can determine that the suspicious activity condition is satisfied based on the absence of a communication from other network devices (e.g., if "no communication from network device 604 when this device normally sends a communication every minute," then perform some action).

The source of the suspicious activity may also be determined (e.g., source localization, after or upon determining that the suspicious activity condition is satisfied, etc.). For example, the communications from the network devices can confirm that the network devices are receiving the same suspicious communications as the evaluating network device. In another example, the communications may confirm that the network devices are detecting similar suspicious activities from the suspect network device and/or help determine the source of the suspicious activity (e.g., network-wide source, device-specific source, etc.). In some examples, the network device may localize a source part of the same network (e.g., a suspect network device, a storm, a power outage, etc.) having operated in a manner to have caused the suspicious activity condition (e.g., that is determined to be satisfied).

In some embodiments, the suspicious activity condition is satisfied when the evaluated data exceeds a threshold. For example, a historical pattern of activity may indicate that a network device toggles on and off 5-times per day. In some examples, the normal operation of the network device may toggle 5-times per day, so the threshold, based in part on that historical pattern, may be 10-times per day (or 50% increase, or other value). When the detected activity meets or exceeds the threshold (e.g., 11 times per day), the network device associated with the detected activity may correspond with an abnormal operation (e.g., based on a pattern, threshold, absolute value, timeframe, etc.).

In some examples, a confidence level may be associated with the determination that a suspicious activity condition is satisfied. For example, if a particular network device (e.g., network device 604) is known to be associated with suspicious activities, the communication from network device 604 may be prioritized lower than the communication from network device 606. In another example, if network device 604 identifies that there is a potential suspicious activity associated with network device 602, other network devices in network 600 may identify that the network device 604 is actually the network device associated with the suspicious activity (e.g., based on historical suspicious activities, etc.).

The confidence level associated with a network device may provoke additional communications. For example, the evaluating network device may contact a third party computing device for additional information about the suspect network device and/or suspicious activity condition. The third party computing device may observe the activities of the network devices in network 600 and provide additional data for the evaluating network device to use in a determination that the suspicious activity condition is satisfied.

In response to the determining that the suspicious activity condition is satisfied, a local operation of the network device may be changed (e.g., if "suspicious activity condition is satisfied," then change a local operation). For example, if the network device 602 is unable to communicate with the Internet, the network device 602 may power off or reboot to help fix the abnormal operation. In another example, the network device 602 may be operated in a safe mode and/or limited operation to help prevent the suspicious activity from recurring or continuing to affect other network devices. As an illustrative example, door lock network device 610 may correspond with the suspicious activity and the suspicious activity condition may be determined to be satisfied. The local operation at the door lock network device 610 may be to lock the door lock network device 610 (e.g., in order to run in a safe mode).

In some examples, the severity of the suspicious activity may identify which local operation would change. For example, when the suspicious activity identifies that a large amount of data is transmitted to a suspicious IP address (e.g., indicating malware), certain functionality at the network device may be disabled to immediately stop the data transmissions. Lower priority changes may include reinstalling an operating system, removing the application that is transmitting the data, running a malware scan on the network device, and other operations that may help prevent the suspicious activity and/or loss of data. In another example, the local operation may correspond with quarantining the suspicious network device. Quarantining the device can include, for example, a logical quarantine of the device from some or all other devices the network. The logical quarantine can include reducing or eliminating an influence that the quarantined device has on other network devices and can include taking actions such as blocking communications from the suspicious device from being transmitted to other network devices, gateways, cloud servers and/or access devices.

One type of local operation can commit device data to a memory. The device can include another (e.g., volatile) memory that is used in other circumstances (e.g., to store current and/or historical device settings, sensor data, local statuses, statuses of other devices, etc. when the condition is not satisfied). The memory can include one for which writing capability and/or speed is limited and/or deteriorates across repeated usages. The memory can include a local memory present in the device and/or a non-volatile memory (e.g., a flash memory, programmable read-only memory, erasable programmable read-only memory, electrically erasable programmable read-only memory, ferroelectric random access memory, non-volatile random access memory, bubble memory, or magnetoresistive random access memory) that does not require power for access to the memory, and/or a low-power memory for which less power is required to write data to the memory than required for traditional RAM writing. The memory can be a reserve memory such that it is not routinely used to store data. For example, in some instances, data is written to the memory only when a suspicious activity condition is satisfied.

Other forms of local operations are available as well. For example, data backup and/or transmissions can be performed using a power reserve, such as a battery in the network device 602. In another example, the network device stores data from a location at the network device to a different location at the network device or at another network device on the same network. Thus, even if the device is damaged or isolated to a point of no longer receiving AC power and/or no longer having capabilities to write to a default memory, the device can nonetheless preserve select data. In another example, a rule affecting a local operation at a network device can be amended. For example, the rule can instruct the motion sensor network device to transmit a communication to a light switch network device when motion is sensed. The communication may instruct the light switch to turn on the light. When the suspicious activity corresponds with the light toggling on and off in response to the rule, the rule may be deactivated, canceled, modified, or deleted to help prevent the suspicious activity from recurring (e.g., causing the rule not to depend on the motion sensor network device for a particular time period).

Additionally or alternatively in response to the detection, the network device 602 can transmit an alert communication to one or more of the other network devices 604, 606, 608 and/or 610. The alert communication can correspond to an indication that the network device 602 has detected activity of the network device corresponding to the suspicious activity condition (e.g., if suspicious activity condition is satisfied, then transmit an alert communication). In some instances, the alert communication can cause or correspond to an instruction to another network device to ensure that a setting of the device is appropriately set (e.g., to power off or in a secure state) and/or to back-up its data (e.g., locally or by transmitting it to another network device, the gateway 110 and/or the cloud 114). Such action can provide the other network device with a lead time and/or increased device capabilities to perform the backup before an effect of an event such as a blackout, brownout, fire, or flood also affects the other device.

Figure 11A:
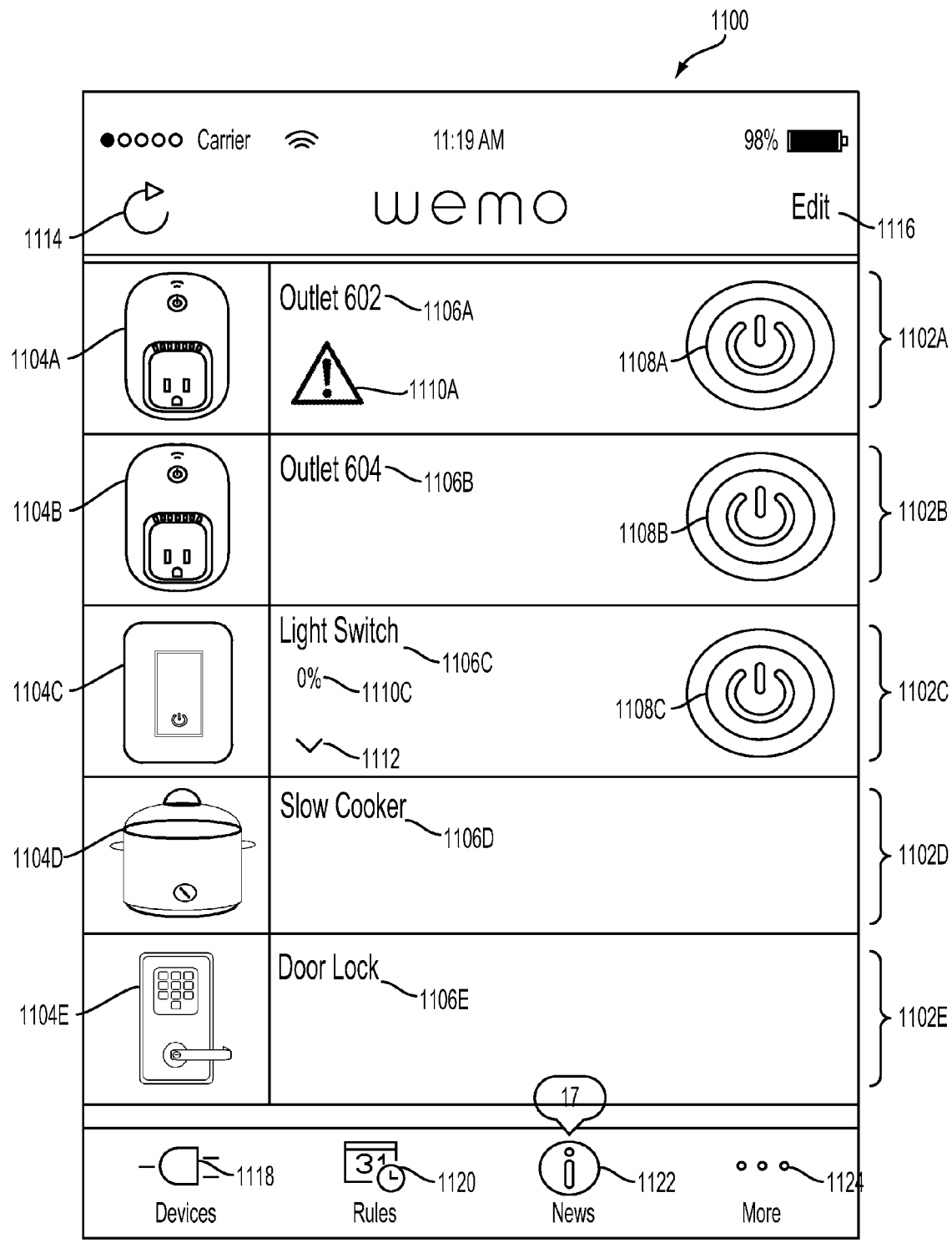
FIGS. 11A-C are illustrations of example alert communications in a network environment, in accordance with some embodiments.
Figure 11B:
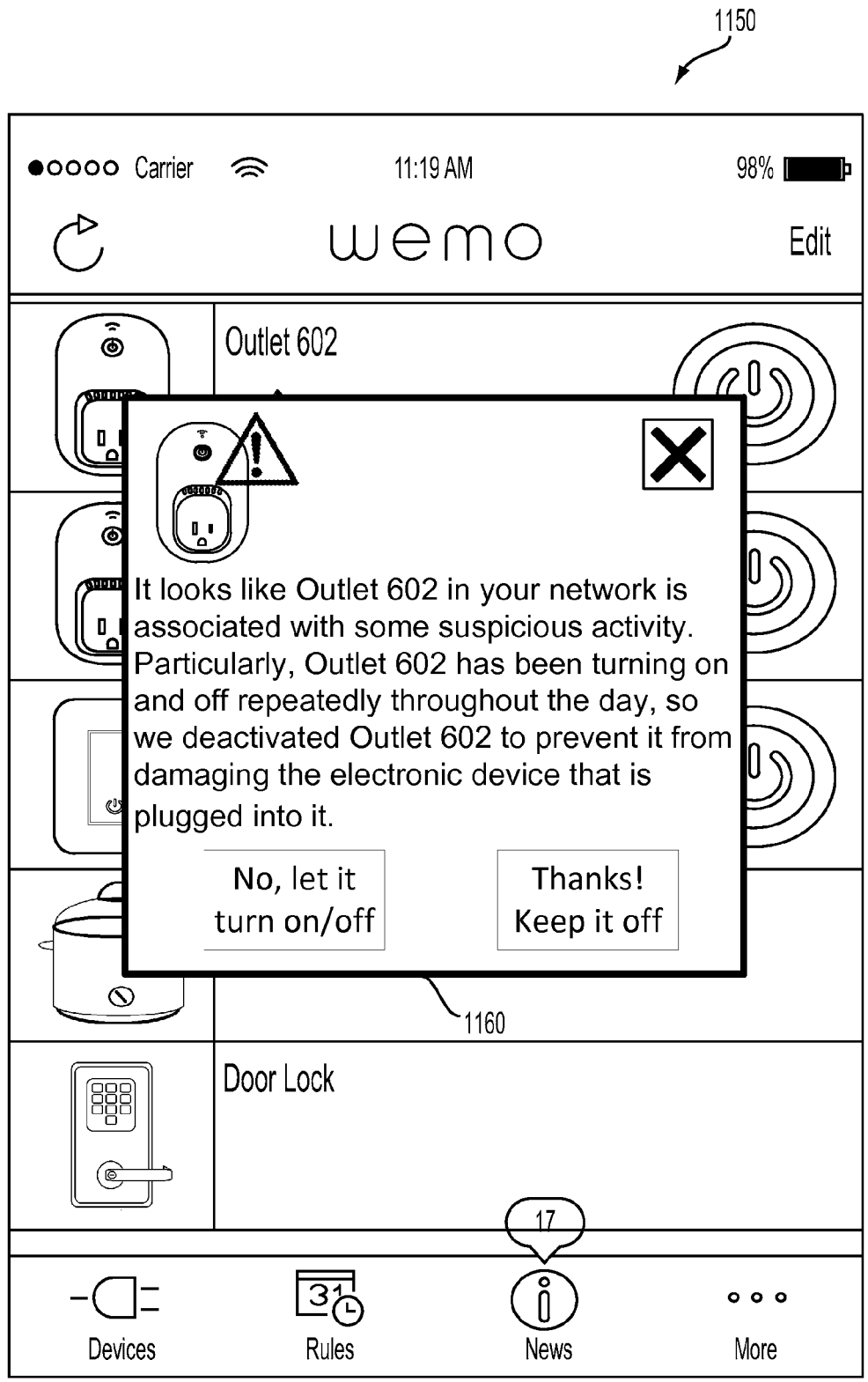

The network device 602 can also or alternatively transmit a same or different alert communication to the access device 108. The alert communication can cause or correspond to an instruction to the access device 108 to present an indication corresponding to the detection, such that a user can be alerted (e.g., of a potential or actual device malfunction or undesirable stimulus). Example illustrations of alert communications to access device 108 are shown in FIGS. 11A and 11B.

An alert communication may include and/or correspond to, for example, an identifier of the transmitting device, an indication that a suspicious activity condition has been satisfied, a sensor reading (or processed version thereof), a threshold, an instruction to backup data, an instruction to change a setting or status, an instruction to change or remove a dependency on the transmitting device, an instruction to present an alert and/or an instruction to change a status identifier stored at the receiving device corresponding to the transmitting device. In response to receiving an alert communication, a receiving device may begin backing up data, change a setting or status, change or remove a dependency on the transmitting device, present an alert, and/or change a status identifier stored at the receiving device corresponding to the transmitting device.

Transmissions may include using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. In some instances, transmissions use a low-energy protocol such that a power reserve can be conserved. When a device is transmitting one or more communications to multiple target devices, the device may or may not use the same communication protocol for each of the target devices. For example, for each of a set of target devices, a device may transmit a communication to the target device using what is estimated to be the lowest-energy communication protocol that will support successful transmission.

In some instances, one or more communications are transmitted to multiple target devices simultaneously or concurrently (e.g., via a broadcast transmission or multiple individual transmissions). In some instances, a device transmits one or more communications to one or more target devices sequentially. For example, a device may successively send communications to a target device using increasingly higher-energy transmission protocols until the target device sends a receipt acknowledgement communication. As another example, a device may first send a communication to a target device physically near the device, subscribed to the transmitting device or having a rule that depends on a status of the device, and the device can later send a communication to a target device further from the device or without the rule. The device can send transmissions according to a priority ranking (e.g., ranking devices based on device type, proximity, user-identified priority, rule dependencies, etc.). Thus, if a battery reserve dies before all transmission are sent, transmissions of highest priority are hopefully already sent.

Similarly, backups may occur in an ordered manner. For example, what data is being backed up may be ordered. Data of particular types (e.g., sensor readings, settings, or rules) may be prioritized over other data types, or recent data may be prioritized over older data. As another example, where data is being backed up may be ordered (e.g., first backing up some or all of a data set on a non-volatile memory, second backing up the same or different data in a volatile memory and then transmitting the same or different data to a cloud server or other device).

In some examples, the alerts may correspond with a priority. The priority may include healing the device itself, and then intervening with the operations of other devices to fix the other abnormal operations. In another example, the priority may include transmitting a communication to the access device 108 (e.g., to inform the user) and/or alerting another network device to transmit a communication to the access device 108 on behalf of the other network devices.

In some examples, the other devices may be instructed to avoid the suspicious network device (e.g., the network device that identified the suspicious activity condition with another network device or itself). For example, the suspicious network device may communicate erroneous instructions to other network devices as a result of malware. The network devices that receive the erroneous instruction may block communication (e.g., from a particular IP address, from a network device identifier associated with the suspicious network device, etc.).

Figure 8:
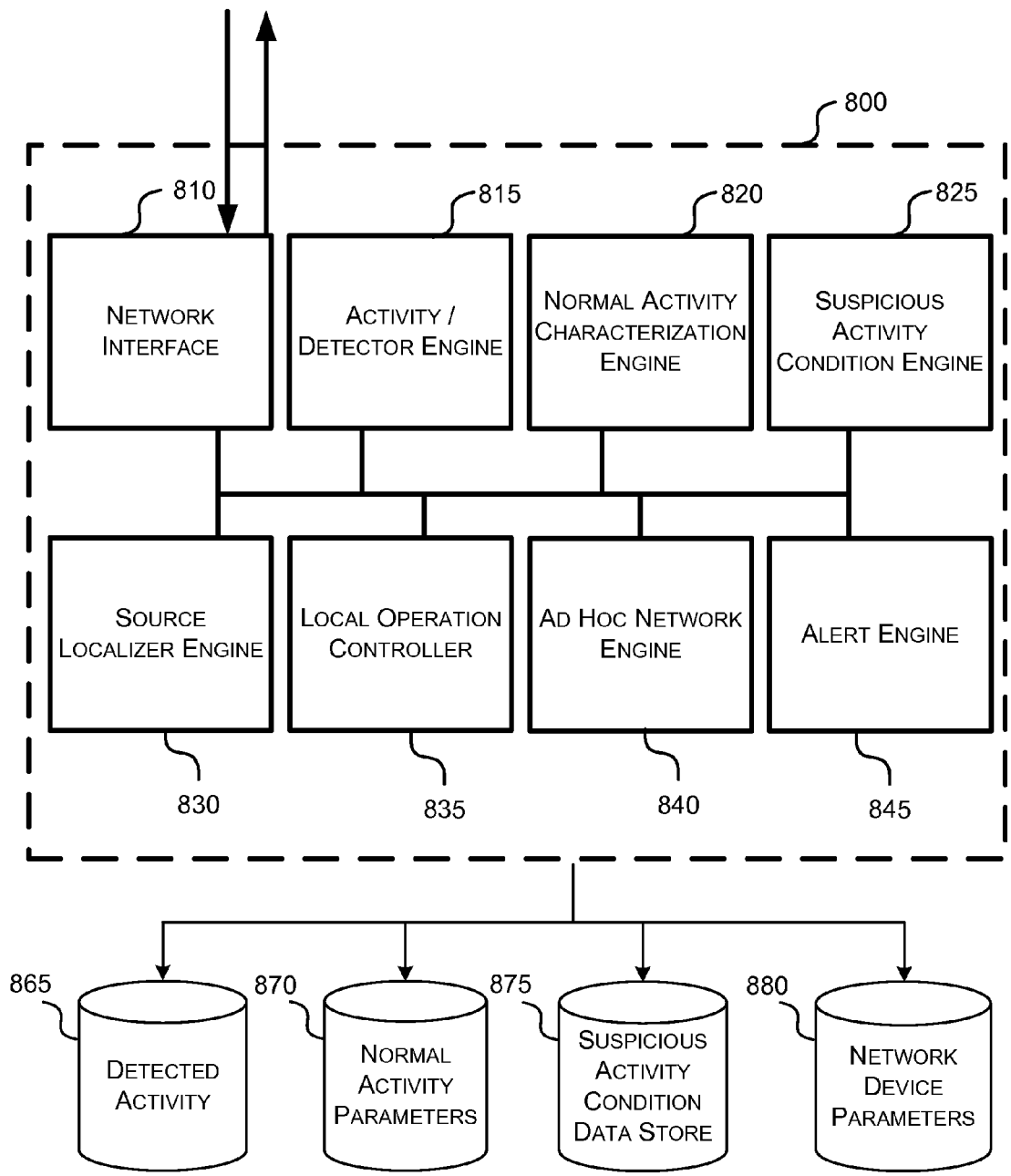
FIG. 8 is an illustration of an example network device that detects abnormal network device operation, in accordance with some embodiments.

FIG. 8 is an illustration of an example network device that detects abnormal network device operation, in accordance with some embodiments. For example, network device 800 includes a network interface 810, activity/detector engine 815, normal activity characterization engine 820, suspicious activity condition engine 825, source localizer engine 830, local operation controller 835, ad hoc network engine 840, alert engine 845, and one or more data stores, including a detected activity data store 865, normal activity parameters data store 870, suspicious activity condition data store 875, and a network device parameters data store 880.

The network device 800 can include a network interface 810. The network interface can allow network devices to access other devices (e.g., network devices 602, 604, 606, 608, 610, access device 108, gateway 110, cloud 114, etc.). The network interface 810 includes features configured to send and receive information, including, for example, a network antenna, modem, transmitter, receiver, network adapter, or any other feature that can send and receive information. The network interface 810 can communicate via telephone, cable, fiber-optic, and other wired communication network. In some embodiments, the network interface 810 communicates via cellular networks, WLAN (wireless local area networking) networks, or any other wireless network. In some examples, the network device 800 can include one or more transceivers, receivers, or combination thereof.

The network interface 810 can also be configured to send and receive data. In some embodiments, the network interface 810 sends data corresponding to a suspicious network device to another network device to be evaluated, sends data corresponding to the requesting device to be evaluated, sends notifications and/or communications that include data corresponding to suspicious activities, receive alert communications associated with suspicious activities or suspicious activity conditions, or other information. For example, a data-request communication can be transmitted to each of the one or more other network devices. The communication can identify the suspect network device and correspond to a request for data corresponding to the suspect network device. In some examples, the notification can be transmitted from the network device to another device that is indicative that the suspicious activity condition has been satisfied.

The network device 800 may also include an activity/detector engine 815. The activity/detector engine 815 for detecting activities or operations associated with the device. For example, one or more detectors can identify when the network device performs an activity (e.g., transmits a communication via the network interface 810, powers off or reboots, senses an abnormal operation with a second network device, etc.). In some embodiments, the detected activities may or may not correspond with the suspicious activity (e.g., in order to generate a log of activities and/or store detected activities in the detected activity data store 865). In some examples, the activity/detector engine 815 may detect local activities (e.g., activities performed by network device 800) and/or remote activities (e.g., activities performed by network devices 606, 608, etc.).

The activity/detector engine 815 may, for example, request data as well. For example, a data-request communication can be transmitted to each of the one or more other network devices (e.g., via the network interface 810). The communication can identify the suspect network device and correspond to a request for data corresponding to the suspect network device. In another example, the detection of an activity or event associated with the suspicious activity condition can trigger a request for additional information. In some examples, the data may be automatically transmitted (e.g., using an internal request for data that activates a transmission of data to another device, etc.) or transmitted after a condition is satisfied.

The one or more detectors can include a sensor (e.g., to detect external, remote, local, or internal activities). The sensor can include one configured to monitor a physical stimulus external to, internal to, or being experienced by the device. For example, the sensor may be configured to monitor temperature, humidity, water or moisture, light, sound, acceleration, and/or rotation. The sensor may generate a sensor reading based on the monitoring that can be stored in a detected activity data store 865. The sensor reading can include a magnitude (e.g., a temperature in ° C. or a percent humidity), a direction, and/or a threshold comparison (e.g., whether an acceleration value exceeded a threshold).

A detector can also include a piece of software that monitors an operation, event occurrence or processing at the device. For example, a detector can include code to monitor IP communications (and/or other network communications) and to extract pertinent information (e.g., a time of a communication, whether it is outgoing or incoming, a source or destination, a size of a communication, a count of communications and/or a frequency of communications).

The network device 800 may also include a normal activity characterization engine 820. The normal activity characterization engine 820 can monitor an operation of a device or device component and identify one or more "normal" parameters. A parameter can relate to and/or include, for example, a setting (e.g., its value and/or when it is normally changed), a supplied power, incoming communications (e.g., which device(s) typically transmit communications to the device, when such communications are typically sent and/or what content is typically in the communications), and/or sensor readings (e.g., which magnitudes are normal and/or which changes are normal). A parameter can also or alternatively relate to temporal dynamics (e.g., a normal frequency or quantity of changes to a base parameter, when (e.g., what times, dates, days of the week, months, etc.) changes are typical, what velocities or accelerations of a parameter are typical, etc.). A parameter can relate to a co-dependence. For example, which values are "typical" for a sensor's reading may depend on a value of another sensor or a setting on a same device and/or on a different device.

In some embodiments, the parameter can include, for example, a threshold, a range, a classification parameter, or a weight. For example, the normal activity characterization engine 820 can identify an upper threshold for a resource usage (e.g., CPU, network, memory or storage usage), a list of device components that are to be responsive, a lower threshold for a write speed, a range for a quantity of inter-device communications typically received during a particular time period in a day, or a relationship between one sensor's readings and another sensor's readings.

In some examples, a parameter is used to identify a normal activity. For example, the operation of a device or device component can be monitored over a period of time (e.g., two-months, 48 hours, etc.) to identify what operation is normal for the device. For example, a network device turns on twice during 9:00 AM and 11:00 AM on most weekdays during January (e.g., 70%, 95%, etc.). A normal activity may be identified within a range or threshold of the identified activities (e.g., when the device turns on zero to three times per week during February, when the device turns on once between 8:00 AM and noon on a weekend, etc.).

In some embodiments, a normal activity is identified through a learning algorithm (e.g., clustering technique, neural network, etc.). For example, the learning algorithm (e.g., a normal activity learning algorithm, etc.) can identify a pattern of activities that appear to be consistently performed by the network device. The learning algorithm can consider various data points, including time of day, frequency of communications, variety of states or statuses of a network device, the duration or frequency of each state or status, interaction history between the network devices, power requirements, and the like. The learning algorithm may consider the data points of one network device in view of other network devices as well, including a situation when the first network device is on and the second network device is transmitting a communication, etc. For example, when the first network device is on and the second network device is transmitting a communication, the learning algorithm may predict that a third network device turns off. When the third network device turns off in this instance, the activity may be a normal activity identified by the learning algorithm.

In some embodiments, the usage pattern and/or normal activities performed by the network device may be stored in the normal activity parameters data store 870. The normal activity parameters data store 870 includes a variety of information for the normal activity characterization engine 820 to use to help determine whether a normal activity has been conducted (e.g., the pattern of normal activities, one or more single activities including when a device turns on at 6:00 AM every morning or that a device transmits a message to another device every 5 minutes, etc.). In some embodiments, the normal activity parameters data store 870 includes rules that implement operations at the network device (e.g., turn on a light when motion is sensed, etc.). The data may include any reasonable information about the normal activities, including device identifier, type of the device, corresponding networks, time of the activity, and the like.

The network device 800 may also include a suspicious activity condition engine 825. In some examples, one or more parameters can be shared with the suspicious activity condition engine 825. The suspicious activity condition engine 825 can access one or more suspicious activity conditions from a suspicious activity condition data store 875. Suspicious activity conditions may be fixed, learned (e.g., using a suspicious activity condition detection algorithm), or defined by a user. The suspicious activity condition can also include one or more parameters for a variable or processed version thereof (e.g., a threshold for a change or acceleration in provided voltage). Each suspicious activity condition can be associated with an action that is to be performed upon satisfaction of the suspicious activity condition. The action can include, for example, changing a local operation, status, or setting of the device, backing up data, and/or transmitting a communication to another device.

Suspicious activity parameters can correspond to normal parameters. For example, if a normal activity parameter includes an upper threshold, the suspicious activity parameter could identify the same value (or maybe a different one, such as one that is 10% or 1 standard deviation higher) as a lower threshold. In another example, a network device turns on twice during 9:00 AM and 11:00 AM on most weekdays during January (e.g., 70%, 95%, etc.). When the normal activity is identified as turning on twice during 9:00 AM and 11:00 AM on most weekdays during January (or within a range or threshold), the suspicious activity may correspond with turning on five or more times during the same time period, or toggling on and off anytime during the year (e.g., not restricted to a time range).

In some embodiments, one or more normal activities can be used to identify one or more suspicious activities. For example, a suspicious activity parameter can correspond to normal parameter and the identification of the normal activity can be complementary to the identification of a suspicious activity. For example, on average, a network device turns on twice during 9:00 AM and 11:00 AM. The normal activity is identified within the range or threshold of the identified activities, as described herein. A suspicious activity may be identified outside of the range or threshold of the identified activities (e.g., when the device turns on 100 times between 9:00 AM and 10:00 AM, etc.).

In some examples, the suspicious activity may correspond outside of a standard deviation from the normal activity identified. For example, if a normal activity parameter includes an upper threshold, the suspicious activity parameter could identify the same or different value (e.g., a value that is 10% or 1 standard deviation higher) as a lower threshold. In another example, if a normal activity parameter includes a range of values (e.g., 10 to 20), the suspicious activity parameter may include a wider range of values (e.g., 0 to 30) or a different range of values (e.g., 40 to 50).

In an illustrative example, normal activity parameters and a suspicious activity condition may be identified. The suspicious activity condition can also include parameters (e.g., suspicious activity parameters), such that the normal activity parameters and suspicious activity parameters may be complementary. When a threshold is incorporated with the parameters, a value within the threshold may be associated with the normal activity parameters while a value outside the threshold (e.g., or within a buffer of the threshold) may be associated with the suspicious activity parameter.

The suspicious activity condition engine 825 can detect local or remote suspicious activity. In some examples, the suspicious activity condition may correspond with local routine transmissions or communications to one or more network devices, communications that correspond with remote requests from other the network devices, data transmitted to an evaluating network device after a local condition is satisfied at the transmitting network device, data transmitted after a local condition is satisfied at the evaluating network device, or data transmitted in response to or in anticipation of other operations.

In some embodiments, the data generated, gathered, analyzed, etc. by the normal activity characterization engine 820 can be used to identify a suspicious activity by the suspicious activity condition engine 825. Additionally or alternatively, a suspicious activity condition can be complementary to a normal activity pattern and/or can include a parameter that is complementary to a normal activity parameter. For example, a normal activity parameter can include a threshold for what is a "normal" number of setting changes within an hour, and a suspicious activity condition can be satisfied when a number of setting changes exceeds the threshold. In another example, the normal activity parameters data store 870 can include an activity template that is associated with normal activity (e.g., not associated with a suspicious activity). For example, an activity template can include a list of activities that are associated with normal activities (e.g., and not associated with a suspicious activity), and, in some examples, add additional activities (e.g., building on the template). When the detected activity is not on the activity template, the detected activity may be suspicious and/or suspicious activity condition may be satisfied. In some examples, the normal activity characterization engine 820 can use a normal activity learning algorithm and/or a suspicious activity condition detection algorithm to identify one or more suspicious activities (e.g., using data in the detected activity data store 865, normal activity parameters data store 870, etc.). For example, the normal activity learning algorithm may identify that a particular activity is a normal activity (e.g., based on a rule that turns the device on every morning at 6:00 AM, based on a comparison with an activity template, etc.).

The suspicious activity condition may or may not vary by network devices, device types, networks, and/or time periods (e.g., as identified by the normal activity characterization engine 820 or other learning algorithm). For example, a motion sensor network device in a high traffic area may receive more data than a motion sensor network device in a low traffic area. The suspicious activity condition may accommodate the difference in the amount of data when determining an abnormal activity. In another example, a light switch network device in a living room may generate more data than a motion sensor in a basement. In some examples, the suspicious activity condition may not vary by network device (e.g., the suspicious activity condition is always satisfied when the network device toggles on and off 10 times in a second, etc.). One or more of these device-specific data points may be stored in the network device parameters data store 880 and/or may be accessed when determining a normal activity and/or suspicious activity.

In some examples, all or part of one or more suspicious activity conditions and/or corresponding actions may be shared or coordinated across the network devices. For example, a first device and a second device may be associated with a suspicious activity condition of an above-threshold noise (e.g., corresponding to an alarm). The first device may respond by backing up its data, whereas the second device may respond by changing to a "locked" state and sending an alert communication to an access device 108. Alternatively, the normal activity may identify that each of the network devices should be on, causing the states of one or more other devices to correspond with a suspicious activity (e.g., satisfying multiple suspicious activity conditions).

The suspicious activity condition engine 825 can use the detected variable(s) to determine whether the suspicious activity condition(s) are satisfied. For example, the suspicious activity condition engine 825 may determine (in accordance with a condition) whether the number of communications has exceeded a threshold, the amount of data transmitted exceeds a threshold, the network has become non-operational, and the like.

When the suspicious activity condition engine 825 determines that a condition is satisfied, one or more actions associated with the condition can be triggered. In one instance, the local operation controller 835 can change a local operation for the network device. As illustrated herein, the local operation can include powering off or rebooting, transmitting an alert communication, turning off the ability to transmit communications or data, quarantining the suspect network device, implementing a new operation, ceasing implementation of an existing operation, or other operations that may help fix the abnormal operation. One or more of these local operations may be stored with the detected activity data store 865.

In one instance, the action includes backing up device data. Backing up data can include, for example, copying data from one data store onto another data store, transmitting data from one data to another data store or collecting data (e.g., instantaneous sensor readings), and storing the data on a data store.

In some instances, the suspicious activity condition engine 825 determines that a suspicious activity condition has been satisfied based on a communication received (via the network interface 810) at the device 800. The received communication can be an alert communication from another device (e.g., sent via the alert engine 845). The alert condition may itself be sufficient to satisfy the suspicious activity condition or may be sufficient only along with other data. For example, a suspicious activity condition may be satisfied based on multiple alert communications. When a suspicious activity condition is satisfied, the device may be triggered to backup data, send an alert communication to one or more other devices, and/or change its operation (e.g., to change a setting or state or to change an operation rule) via the local operation controller 835.

The network device 800 may also include a source localizer engine 830. In some embodiments, the source localizer engine 830 may interact with the network interface 810 to communicate with other network devices to help find the source of the suspicious activity. For example, light switch network device 606 in FIGS. 6-7 may receive one communication per second to toggle on and off the lamp coupled with the light switch network device. The source of the communications can be from a user activating the light switch network device 606 once per second (e.g., a child is pressing the light switch over and over). Alternatively, the source of the communication may be from a malware application and/or existing rule associated with the network device that is erroneously instructing the light switch to toggle on and off. In another example, the source of the communication may be a light storm that is toggling the power to the entire network on and off. In these examples, the source of the suspicious activity can help determine the appropriate action to take in response (e.g., sending the alert communication, changing the local operation, etc.). The network device may identify the source of the suspicious though communications with the other network devices (e.g., "I'm having this problem. Are you performing/detecting this activity too?").

The network device 800 may also include a local operation controller 835. The local operation controller 835 may, for example, control any operation, including backing up data, changing a setting or state to a power-off state, a secure state (e.g., to lock a security device) or an alarm state (e.g., to sound an alarm), a low-power state (e.g., to reduce energy consumption), or other states, changing communication protocols, modifying (or deleting) rules, and the like. For example, the local operation controller 835 can identify which data is to be backed up and/or where it is to be backed up to (e.g., each of which can be identified in association with the satisfied condition and/or action to be performed). In some instances, data is to be stored on a local reserve memory, such as a non-volatile reserve memory (e.g., a flash memory). The stored data can include recently detected data (e.g., sensor readings or performance metrics), recent or current device settings or states, stored rules for the device or usage patterns, and the like.

Satisfaction of the suspicious activity condition may also or alternatively trigger a change in a setting or state (e.g., implemented by a local operation controller 835), and/or trigger a change in a rule (e.g., at a suspect network device, at an evaluating network device, etc.). For example, the local operation controller 835 may modify or suppress rules such that network device 800 operates independently of one or more other network devices (e.g., to avoid scheduled state changes) and/or is quarantined from communicating with other network devices.

The network device 800 may also include an ad hoc network engine 840. In one example, the ad hoc network engine 840 can establish a network to communicate through a communication infrastructure. The network can include, for example, establishing a Bluetooth or WiFi connection with a second device, creating a mesh network so that communications can hop to different network devices (e.g., nodes), establishing a hot spot (e.g., using WiFi technology) so that other devices may connect, identifying an incomplete subset of network devices to use in generating an ad hoc network, communicating with one or more network devices within the ad hoc network, iteratively altering an ad hoc network, and/or other means of establishing a communication network between the network devices when the default or standard network is inoperable.

The ad hoc network engine 840 may initiate an ad hoc network to communicate. The ad hoc network engine 840 can identify an incomplete subset of the set of network devices as part of the ad hoc network. In some examples, the incomplete subset may include a plurality of network devices and each network device in the incomplete subset may be configured to also detect activity of the suspect network device (e.g., internal or external to the network device).

In some embodiments, the one or more network devices are selected based on a situation. For example, a light switch network device may detect a suspicious activity (e.g., power toggling on and off), and form an ad hoc network with other network devices to communicate (e.g., in the same room, within 10 feet of the light switch network device, in the same home or building, etc.). In another example, the light switch network device may detect a suspicious activity (e.g., an Internet connection through the gateway 110 turned off an hour ago), and the ad hoc network can be formed with all of the other network devices that experienced the same suspicious activity during the same time frame. The communications within the ad hoc network can transmit data (e.g., to determine the source of the activity, to confirm that the activity is not internal and experienced by other network devices, etc.).

In some embodiments, the source localizer engine 830 and the ad hoc network engine 840 may work together to help find the source of the suspicious activity. For example, the ad hoc network engine 840 may establish an ad hoc network of network devices 602, 604, and 606. Network device 602 (e.g., through the source localizer engine 830 and/or network interface 810) can communicate with network devices 604 and 606 to determine if these network devices are detecting the same suspicious activity. Based on these communications, network device 602 can determine that the suspicious activity is internal (e.g., at network device 602) or external (e.g., at network device 604, in the network as a whole, etc.).

The ad hoc network engine 840 may also expand or systematically alter the ad hoc network in response to these communications. For example, when network devices 604 and 606 do not detect the same suspicious activity as network device 602, the ad hoc network engine 840 can expand the ad hoc network to include additional network devices (e.g., network devices 608 and 610). When additional network devices are included, network device 602 can also communicate with network devices 608 and 610 to help determine the source of the suspicious activity. In another example, when only light switches (or other types of network devices) detect the suspicious activity, the ad hoc network engine 840 can alter the ad hoc network to include more light switches for the network device 602 to communicate with (e.g., by adding or removing network devices by type from the ad hoc network).

In another example of iteratively altering the ad hoc network (e.g., by the source localizer engine 830 and/or the ad hoc network engine 840), a first ad hoc network can include all light switch network devices in a room. A second ad hoc network can include all light switch network devices and outlets in a room. A third ad hoc network can include all light switch network devices and outlets in a 5-foot radius. A fourth ad hoc network can include only one device (e.g., the suspect network device). It should be appreciated that any iteration of ad hoc network of one or more network devices is available without diverting from the essence of the disclosure. The iterative alterations of the ad hoc network can help determine the source of the suspicious activity, collect and analyze more relevant data (e.g., to determine if a suspicious activity condition is satisfied, etc.), and the like.

In some examples, the ad hoc network engine 840 can identify particular network devices to contact. The communications can verify an abnormal operation of a network device and/or to use for the source localizer's localization efforts. For example, when a particular network device has been identified as a suspect network device, the suspect network device may be removed from the ad hoc network and/or quarantined. In another example, the ad hoc network may include the suspect network device in order to help fix or change the operation at the suspect network device as part of a smaller network (e.g., to not affect the entire network).

The network device 800 may also include an alert engine 845. The alert engine 845 can generate a communication (e.g., when the suspicious activity condition is satisfied). Generating the communication may include identifying one or more variables or other content to include in the communication, such as a threshold, historical activity summary, sensor reading, or instruction for a receiving device. In some embodiments, identifying the one or more variables can indicate that the suspicious activity condition has been satisfied. The alert communication can include information about the device 800 (e.g., a device identifier or identifier of a type of the device), one or more networks (e.g., a local area network identifier or another network identifier), a time, and the like.

For a given alert communication, the alert engine 845 can identify one or more target devices to which to transmit the communication. This identification can include identifying one or more devices having one or more characteristics (e.g., being associated with a particular network, having a particular or above-threshold priority, being located within a given proximity or area, and/or being of one or more device types) and/or identifying a defined list of one or more target-devices. The identification may also include prioritizing identified devices, such that an alert communication can be sent to one or more low-order devices before an alert communication is sent to one or more higher-order devices. In some embodiments, the alert communication can also or alternatively transmit to the access device 108, causing or corresponding to the user being alerted (e.g., of a potential or actual device malfunction or undesirable stimulus).

The alert engine 845 can also identify a transmission protocol by which to send an alert communication. In some instances, different alert communications are sent using different protocols and/or alert communications sent to different devices or device sets are sent using different protocols. In some instances, a transmission protocol selection may depend on whether a previous transmission was successful (e.g., whether a receipt acknowledgement was received), a progress of a data backup effort and/or a portion of a power reserve left available. A selection of a transmission protocol may depend on a characteristic of a target device (e.g., a priority, location and/or status).

The network interface 810 can then transmit the generated alert communication to an identified target device using an identified transmission protocol. The transmission may include a wireless transmission. The network interface 810 may also, in some instances, be configured to detect an acknowledgement communication, which may be conveyed to the alert engine 845 (e.g., such that it can avoid attempting re-transmission or influence transmission-protocol selections).

Figure 9:
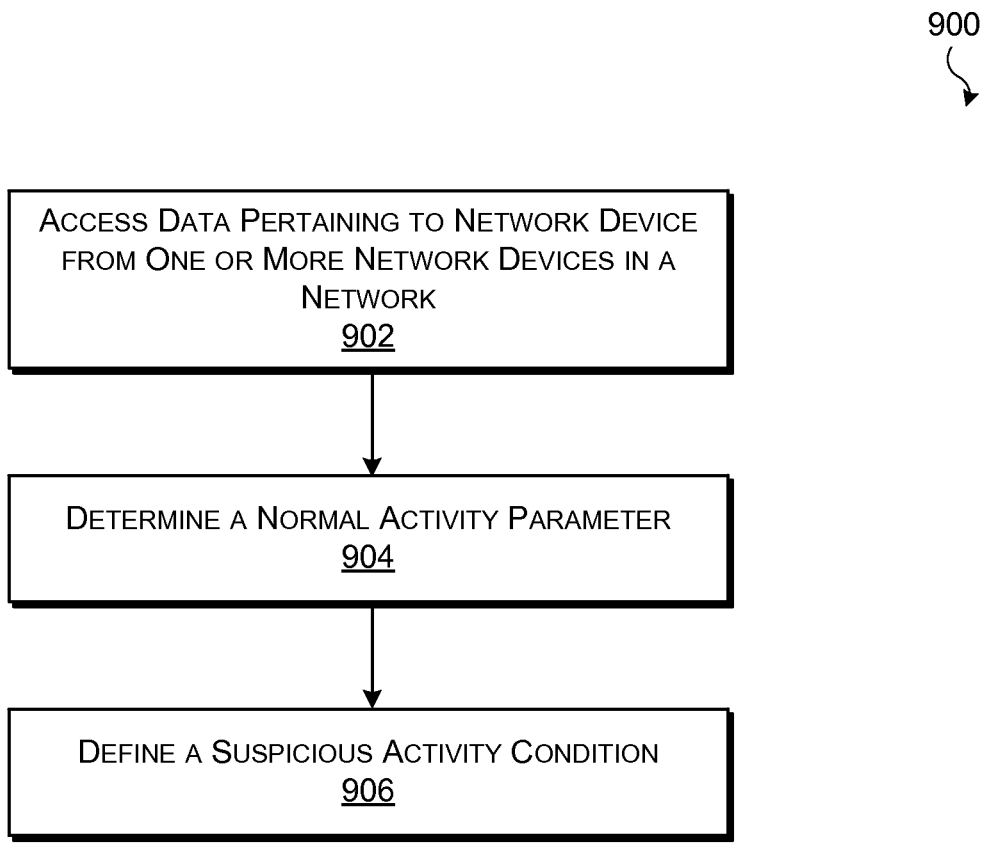
FIG. 9 is a flowchart illustrating an embodiment of detecting abnormal network device operation, in accordance with some embodiments.

FIG. 9 is a flowchart illustrating an embodiment of detecting abnormal network device operation, in accordance with some embodiments. Process 900 can be performed in part or in its entirety at a network device.

At 902, data is accessed. The data may correspond with a network device from one or more network devices in a network. For example, the activity/detector engine 815 can access data from the detected activity data store 865. The accessed data can identify operations, activities, or other information pertaining to one or more network devices in the network. The data may relate to the device that is performing process 900 (e.g., by receiving data from local device components).

One or more devices associated with the data may be identified using various methods. For example, a network device might monitor data pertaining to each other device in the network (e.g., continuously, during a time frame, at predefined intervals, etc.). In other examples, the data may be associated with each other device for which a rule indicates the evaluating device's operations depend on, each other device of a same type in a network, etc.

In some examples, the data may include communications from another network device in network (e.g., corresponding to malware or device malfunction). In some instances, the data may be indicative of a loss of access to a network (e.g., Internet, the gateway 110, etc.), high temperature (e.g., corresponding to a fire, warm conditions, or device malfunction), water (e.g., corresponding to a flood or a water spill), high humidity (e.g., corresponding to a flood), non-responsiveness of a component of the device (e.g., corresponding to a malfunction of the device), toggling power of another network device in network, a power surge, input (e.g., a frequency, count, type and/or receipt times), and the like experienced by or detected at a network device.

Data may be accessed. For example, the activity/detector engine 815 can access data from a local data store (e.g., detected activity data store 865) or remote source (e.g., third party data store, received from another device as a communication, etc.). The data store(s) can be populated with data upon receiving communications, detecting sensor values, at routine intervals, etc. The accessed data can identify operations, activities, or other information pertaining to one or more network devices in the network (e.g., data relating to a presence, count, frequency, device source, content of a transmission, etc.).

In some examples, the network devices may constantly transmit communications to indicate to other devices that they are present (e.g., every 5 seconds, every minute, every 5 minutes, etc.) and the presence or absence of the communication may be the data (e.g., instead of the content of the communication). The communication may be a type of site survey or beacon (e.g., including a network identifier like a service set identification (SSID) of the home local area network, a media access control (MAC) address of the gateway, and/or the like).

At 904, one or more normal activity parameters can be determined. For example, normal activity parameters may be determined based on the data accessed at block 902. For example, a normal activity parameter may include a threshold or range of an observed frequency of setting changes, range of times of receipt of setting changes, frequency of communications received (e.g., generally or from a particular device), range of times of receipt of detections (e.g., motion detections) frequency of detections, and/or range or threshold of values detected by a sensor. Ranges and/or thresholds can, in some instances, be set to be inclusive of all corresponding accessed data. In some instances, ranges and/or thresholds are set to include a subset of the accessed data (e.g., to include at least 90% of the data). In some instances, a range and/or threshold are set using a technique such as a distribution-characterizing technique (e.g., fitting a distribution curve and setting the range and/or threshold based on the curve), a modeling technique (e.g., to identify expected values given particular conditions, such as to identify expected security unlock/lock input settings based on time of day), a standard-deviation technique (e.g., to identify a threshold to be two standard deviations from a mean), and so on. In some instances, a normal activity parameter is determined based on user input and/or a device setting (e.g., indicating that a device is not to power on/off more than two times per second). The parameter can relate to (e.g., set a threshold for) and/or include, for example, a setting (e.g., its value and/or when it is normally changed), supplied power, characteristic of an incoming communication (e.g., which device(s) typically transmit communications to the device, when such communication are typically sent and/or what content is typically in the communications), or sensor reading (e.g., which magnitudes are normal and/or which changes are normal).

In some examples, the parameter is one used to characterize normal (e.g., common or appropriate) data. For example, the operation of a device or device component can be monitored over a period of time (e.g., two-months, 48 hours, etc.) to identify what operation is normal for the device. For example, a network device turns on twice during 9:00 AM and 11:00 AM on most weekdays during January (e.g., 70%, 95%, etc.). A normal activity parameter may be identified within a range or threshold of the identified activities (e.g., when the device turns on zero to three times per week during February, when the device turns on once between 8:00 AM and noon on a weekend, etc.).

In some embodiments, a normal activity parameter is identified through a learning algorithm (e.g., clustering technique, neural network, etc.). For example, the learning algorithm (e.g., a normal activity learning algorithm, etc.) can identify a pattern of activities that appear to be consistently performed by the network device. The learning algorithm can consider various data points, including time of day, frequency of communications, variety of states or statuses of a network device, the duration or frequency of each state or status, interaction history between the network devices, power requirements, and the like. The learning algorithm may consider the data points of one network device in view of other network devices as well, including a situation when the first network device is on and the second network device is transmitting a communication, etc. For example, when the first network device is on and the second network device is transmitting a communication, the learning algorithm may infer that a third network device turns off. When the third network device turns off in this instance, the activity may be determined to conform with a normal activity parameter identified by the learning algorithm.

In some embodiments, the usage pattern and/or normal activity parameters performed by the network device may be stored in the normal activity parameters data store 870. The normal activity parameters data store 870 includes a variety of information for the normal activity characterization engine 820 to use to help determine whether data conforms with a normal activity parameter (e.g., the pattern of normal activities, one or more single activities including when a device turns on at 6:00 AM every morning or that a device transmits a message to another device every 5 minutes, etc.). In some embodiments, the normal activity parameters data store 870 includes rules that implement operations at the network device (e.g., turn on a light when motion is sensed, etc.). The data may include any reasonable information about the normal activities, including device identifier, type of the device, corresponding networks, time of the activity, and the like.

At 906, a suspicious activity condition is defined. The condition can be determined based on the accessed data and/or the normal activity parameter. In some instances, the suspicious activity condition is one to be evaluated using the type of data accessed at block 902. In some instances, the suspicious activity condition is complementary of a normal activity parameter. For example, a suspicious activity condition can be one that is satisfied when data does not conform with one or more normal activity parameters. As described, a suspicious activity condition can be a threshold, Boolean expression (e.g., resulting in true, false, or null), process, technique (e.g., clustering technique where a cluster of data points associated with the clustering technique is either suspicious or normal, etc.), flowchart (e.g., whether the activity is suspicious or normal after a series of steps, etc.), or similar value that helps identify an abnormal operation (e.g., if suspicious activity condition is satisfied, then perform an action).

The suspicious activity condition can be identified through a variety of methods. In some embodiments, a network device can identify a suspicious activity condition with respect to a pattern of data (e.g., "normal activity"). For example, the network device 602 may evaluate historical data to determine that, during a standard time frame, two people leave a home in the morning and two people arrive in the evening (e.g., identified by a motion sensor network device by the front door of the home). Any activity outside of this pattern may identify suspicious activity, such that the corresponding suspicious activity condition includes, if "anyone other than two people leave a home in the morning and two people arrive in the evening," then do some action. In another illustrative example, the network device can identify the suspicious activity condition in association with transmitting data (e.g., if "transmitting more than 2 megabytes of data in 10 seconds," then do some action, or if "transmitting data to an unknown IP address," then do some action).

The suspicious activity condition can be associated with the device itself, another device, multiple devices in the network (e.g., a sub-network), or the network as a whole. For example, the suspicious activity condition can correspond with an activity associated with a suspect network device and an evaluating network device can identify the suspect network device's activities. It will be appreciated that a suspicious activity condition may, or may not, vary across specific identities or device characteristics of an evaluating device and/or suspect device. For example, Evaluating Device A may use Suspicious Condition A when evaluating Devices B and C (e.g., being a same type or in a same location), but may use Suspicious Condition B when evaluating Device D. In another example, a suspicious activity condition can correspond with an activity associated with the evaluating network device itself. In some instances, a suspicious activity condition is determined in part or in full by another device. For example, the suspicious activity condition may be determined based on data collected at a device performing process 900 (characterizing local operations) and also based on data collected at another device (characterizing its local operation).

As an illustration, the network device may detect that the connection to the Internet is no longer available (e.g., if "network unavailable," then perform some action). The network device may have an issue internally that prevents it from connecting to the Internet (e.g., other network devices can still connect to the Internet) or other devices may also experience the same connection issue. In some examples, the network device may not know initially where the problem is and/or how to respond. In either example, the suspicious activity condition may still be identified (e.g., if "problem with network based on historical activity data for network" then perform some action).

In some embodiments, a network device receives one or more communications from a second network device. Based on a presence, transmission time, transmission frequency and/or communication content, the network device can preliminarily estimate that the second network device is behaving suspiciously (e.g., by determining that a local suspicious activity condition is satisfied). In response, the network device can request data from a third network device. The third network device can then send a communication that can confirm or undermine the preliminary estimate. This communication can thus suggest whether a "problem" that the network device is detecting with respect to the second network device is in fact a problem with the second network device or is a problem with the network device, network, or some other source.

Figure 10:
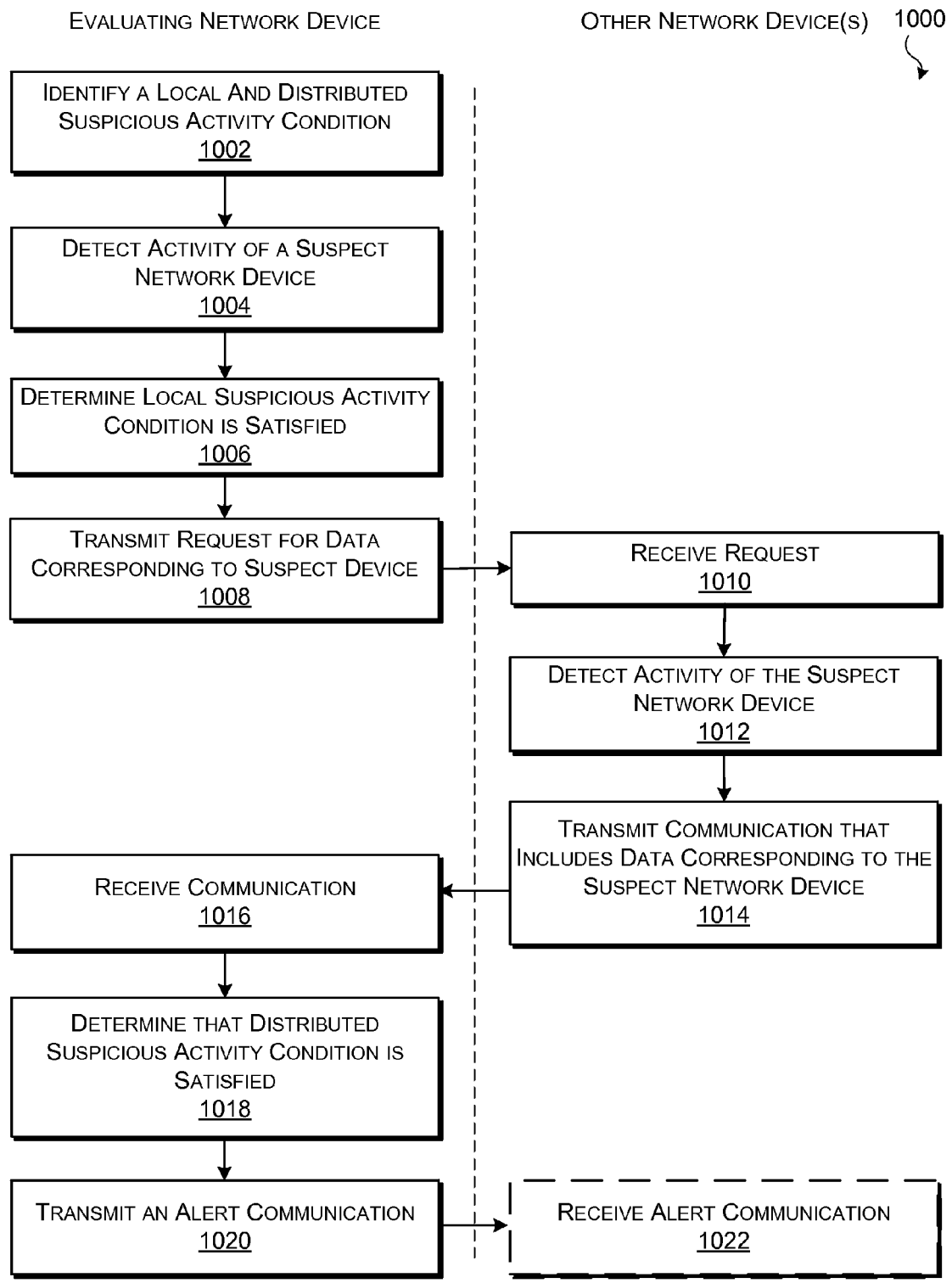
FIG. 10 is a flowchart illustrating an embodiment of detecting abnormal network device operation, in accordance with some embodiments.

FIG. 10 is a flowchart illustrating an embodiment of a first network device detecting abnormal operation of a second network device based on activities detected locally and from a third network device, in accordance with some embodiments. Process 1000 can be performed in part or in its entirety at a network device.

At 1002, an evaluating network device identifies a local and distributed suspicious activity condition. Each of the local suspicious activity condition and the distributed suspicious activity condition can relate to whether activity of an independent device (in communication with the evaluating device) is sufficient to satisfy the condition. That is, the conditions can correspond to a remote assessment by an independent evaluating device, as to whether another device is behaving abnormally. The local suspicious activity condition can correspond with an activity detected at a particular network device (e.g., the evaluating network device) and the distributed suspicious activity condition can correspond with an activity at one or more network devices in the local area network.

The local and/or distributed suspicious activity condition can be identified through a variety of techniques. One or both conditions may be defined, for example, using process 900, using a learning technique, based on user input and/or a device setting. In some embodiments, the evaluating network device (or other network devices) can identify the suspicious activity condition by identifying a pattern in data. For example, the evaluating network device may evaluate historical data to determine that, during a standard time frame, when a child returns home (e.g., the motion sensor senses two people returning home at 1 PM on weekdays after daycare), the light switch in the living room toggles on an off for 1 minute. Any activity outside of this pattern may identify suspicious activity, such that the corresponding suspicious activity condition includes, if "lights other than the light in the living room toggles on an off at 1 PM on weekdays," then do some action.

One or both suspicious activity conditions may include one or more parameter thresholds, variable co-dependencies, operation patterns, ranges, a clustering technique, etc. For example, a suspicious activity condition may identify one or more ranges or particular values for each of one or more activity parameters for each of a set of time periods. The condition may be structured to be satisfied when, for an appropriate time period, any of the one or more activity parameters fall outside of the corresponding range or do not match the corresponding particular value(s). As another example, a suspicious activity condition may identify a clustering technique and an indication as to which cluster assignment corresponds to satisfaction of the condition.

At 1004, the evaluating device detects activity of the suspect network device. Though referred to in block 1004 as a "suspect" device, in some embodiments, the evaluating network device need not yet have identified any suspicious activity associated with the device. The adjective is used to keep the name consistent for later blocks. It will be appreciated, however, that in some instances, the suspect network device is one for which it was previously determined that a (local and/or distributed) activity condition was satisfied. Process 1000 may then relate to follow-up monitoring.

In some instances, the evaluating device monitors each of one or more "suspect" network devices by detecting activity corresponding to the device (e.g., and then determining whether a suspicious activity condition is satisfied). The one or more "suspect" network devices can include, for example, one, some, or all devices: on a network; of a particular type; having its operation controlled in a manner that depends on the evaluating device; exerting at least some control on an operation of the evaluating device; being located in near the evaluating device (e.g., in a same room, on a same floor, near enough to be able to communicate view a short-range communication channel); having recently (e.g., within a defined time period) or in total transmitted a threshold number of communications to the evaluating device; and/or being a destination of a threshold number of communications having been sent from the evaluating device.

Activity may be detected at routine times and/or routine time intervals and/or in response to particular events. For example, activity may be detected during or in response to receiving a communication from a suspect device.

The activity can be passively collected or be received in response to an active collection of the activity. For example, the evaluating network device may send a request to the suspect device for one or more activity parameters (e.g., processing speed, task latency, sensor measurements, input detections, settings, power detections, etc.). A response can then include activity and/or the activity can include details about a response (e.g., presence, latency, communication channel, etc.).

The activity can correspond to a type of data used to evaluate the local suspicious activity condition. The activity can relate to a communication received from and/or about the suspect network device. The detected activity can include one or more values, selections, settings, states, and/or times. The activity can include, for example, a time that a communication was received from the suspect device, a count or frequency of communications received from the network device, content included in a communication received from the suspect device, an operation instruction from the suspect device, and/or an identified setting or sensor measurement from the suspect device.

It should be appreciated that the device is referred to as a "suspect network device" at this stage for ease of explanation as the process continues to determine that it is a suspect device due to satisfaction of a suspicious activity condition. The device need not, however, be deemed to be associated with suspicious activity at this point in the process. For example, in some instances, one or more devices may be routinely monitored irrespective of their prior activities.

At 1006, the evaluating device determines, based on the detected activity, that the local suspicious activity condition is satisfied. Block 1006 can include evaluating the local condition based on the activity, e.g., by determining whether a value of the detected activity is within a range or exceeds a threshold, whether one or more activity values conforms with a pattern, etc. In some instances, block 1006 includes identifying which local suspicious activity condition is satisfied and/or for which device the condition is satisfied.

In some examples, determining that the local suspicious activity condition is satisfied includes comparing the detected activity of the suspect network device with one or more learned normal activity parameters.

In response to determining that the local suspicious activity condition is satisfied, at block 1008, the evaluating network device transmits a request for data corresponding to the suspect device to one or more other network devices, each of which receives the request at block 1010. The request may include an identifier of the suspect device, an identifier of the evaluating network device, the detected activity (or processed version thereof), an identification of which condition was satisfied, an identification of which activity to monitor (e.g., which may be of a same or similar type to that detected in block 1004), and/or an identification which data is requested in a communication (e.g., to include activity or a confirmation or rejection as to whether similar activity is being detected).

The one or more other network devices can include those on a same network as the evaluating network device and/or suspect device, communicating with a same gateway device as the evaluating network device and/or suspect device, with a defined physical proximity to the evaluating network device and/or suspect device (e.g., in a same room or within a prescribed distance), those of a same device type as the evaluating network device and/or suspect device, those that are part of an identified ad hoc network. In some instances, which devices are to receive the request depends on which local suspicious activity condition was satisfied or a value of the detected activity.

At 1012, each of the one or more other network devices detects an activity of the suspect network device. The activity detected at block 1012 may be of a same or similar type to that detected at block 1004. The activity detected at block 1012 may correspond to a type of data evaluated by the distributed suspicious activity condition and/or that corresponding to activity and/or data of interest as identified in the request.

In some instances, the activity is detected in response to the request. In other instances, the activity is routinely monitored and detected (e.g., continuously or at routine intervals), in which case the request may merely trigger generation and/or transmission of a communication relating to the activity.

In some instances, in addition to or instead of detecting activity of the suspect network device, other pertinent activity is detected. For example, one or more other network devices may detect activity of the evaluating network device to as to provide a basis for determining whether the evaluating network device may be a cause of suspicious activity (e.g., and the suspect network device may be operating normally). As another example, one or more other network devices may detect activity of a gateway server, a cloud server of itself. Such detections may identify, e.g., whether a source of suspicious activity is in fact tied to a gateway device, a cloud server, a power problem (e.g., power spike), unusual environmental factors (e.g., where many people are gathered in a room), etc.

At 1014, each of the one or more other network devices generates and transmits a communication to the evaluating network device. The communication includes data characterizing the activity detected in correspondence to the suspect network device by one or more other network devices. In some instances, the data includes the detected activity (e.g., a time of a most recent communication that the other device has received from the network device). In some instances, the data includes a processed version of the detected activity (e.g., a statistic calculated based on the activity, a determination as to whether the activity is consistent with the activity detected by the evaluating device, or a determination as to whether a (local or distributed) suspicious activity condition is satisfied).

At 1016, the evaluating network device receives the communication from each of the other network devices. A communication may be received from one or more other network devices at the evaluating network device.

The received communication from the other network devices can confirm that the one, more, or all of the other network device(s) are detecting corresponding suspicious activity and/or determining that a suspicious activity condition is satisfied based on activity of the suspect device (e.g., due to them having receiving the same suspicious communications as the evaluating network device). In another example, the communications may confirm that the network devices are detecting similar suspicious activities from the suspect network device and/or help determine the source of the suspicious activity (e.g., network-wide source, device-specific source, etc.). In some examples, the network device may localize a source part of the same network (e.g., a suspect network device, a storm, a power outage, etc.) having operated in a manner to have caused the suspicious activity condition (e.g., that is determined to be satisfied).

At 1018, the evaluating network device determines that the distributed suspicious activity condition is satisfied. This determination can be based on the data in the communication(s) received from the other network device(s). Determining that the distributed suspicious activity condition is satisfied may, but need not, also be based on the activity detected by the evaluating network device. For example, in one instance, the evaluating device only receives a communication from an other network device that includes data corresponding to the suspect network device upon having determined that a local suspicious activity condition is satisfied based on the activity detected by the evaluating device. Thus, further assessment of such activity may not be needed (e.g., and the evaluating device can then simply assess whether other devices are detecting suspicious activity).

Determining that the distributed suspicious activity condition is satisfied may include, for example, determining whether a value of the data exceeds a threshold and/or falls within a range, processing data received from multiple other devices (e.g., to compute an average or to identify a count or percentage of devices reporting data corresponding to suspicious activity), and/or determining whether data received from one or more other devices is consistent with the activity detected at block 1006 (e.g., matches the detected activity or includes a value that is within a defined percentage or amount from a value of the detected activity).

In some examples, the determination that the suspicious activity condition is satisfied may trigger identifying a source of the suspicious activity (e.g., source localization via the source localizer engine 830, upon determining that the distributed suspicious activity condition is satisfied, etc.). For example, the source may include the suspect network device, the evaluating device or another device or circumstance. To illustrate, if multiple devices detect that the suspect device corresponds with suspicious activity and if other devices are operating properly, it may be estimated that the suspect device is the source of the suspicious activity. Meanwhile, if only the evaluating device detects suspicious activity corresponding to the suspect device, and other devices detect normal activity from the suspect device, it may be estimated that the evaluating device is the source. Meanwhile, if the evaluating and/or other network devices detect that multiple devices correspond with suspicious activity (the suspect device being one of them), the suspect device may, or may not, be the source. At this point, connections between devices (e.g., which gateway device suspiciously acting network devices are connected to, which device(s) suspiciously acting network devices' operations depend on via rules, which device(s) suspiciously acting network devices' operations influence via rules, where suspiciously acting network devices are located (e.g., which may identify shared breakers), etc.) can be analyzed so as to identify a device or environmental source of the suspicious activity.

It will be appreciated that, depending on the embodiment, if it is determined that the suspect device is operating suspiciously but that it is not the source of the issue, such circumstances may or may not be sufficient to nonetheless satisfy the distributed suspicious activity condition. For example, no matter what the cause, if a state of the suspect device is rapidly changing, it may be important to reduce an influence that the suspect device has within a network. Yet as another example, it may be unnecessary to power the device off.

In some embodiments, the absence of a communication may correspond with determining that the suspicious activity condition is satisfied. For example, when the network devices transmit communications to indicate to other devices that they are present, the absence of the communication may indicate that there is a suspicious activity in the network and/or that the suspicious activity condition is satisfied.

At 1020, the evaluating network device generates and transmits an alert communication. The alert communication may be transmitted to one or more other devices associated with a same network (e.g., the suspect network device, other network devices, the access device 108, a gateway device, a cloud server, etc.). For example, the alert communication can be transmitted to all devices on the network, those devices having transmitted communications to the evaluating device at block 1014, devices identified as being influenced by an operation of the suspect device via a rule and/or devices identified as influencing operation of the suspect device via a rule. In some instances, the distributed suspicious activity condition identifies which devices are to receive an alert communication in response to a determination that the condition has been satisfied. The recipients of the alert communication may depend on, for example, which distributed suspicious activity condition was satisfied.

The alert communication can identify the suspect device, identify the evaluating device, correspond to an indication that the network device has detected activity of the network device corresponding to the suspicious activity condition (e.g., the local suspicious activity and/or distributed suspicious activity), and/or identify information about which condition has been satisfied. In some instances, the alert communication can include an instruction to or otherwise cause another network device to, for example, eliminate a dependency via a rule on the suspect device, to reduce or eliminate transmissions to the suspect device, to power off, to change to a secure state and/or to back-up its data (e.g., locally or by transmitting it to another network device, the gateway 110 and/or the cloud 114). Such action can provide the other network device with a lead time and/or increased device capabilities to perform the backup before an effect of an event such as a blackout, brownout, fire, or flood also affects the other device. As one example, an alert communication can include an instruction to avoid the suspect network device (e.g., the network device that identified the suspicious activity condition with another network device or itself). For example, then a device receiving an erroneous instruction from the suspect device (e.g., as a result of malware) can ignore the instruction. It will be appreciated that, when an alert communication is sent to multiple devices, content of the alert communications may, or may not, be the same across the communications.

As noted above, in some instances, an alert communication is transmitted to the access device 108. The alert communication can cause or correspond to an instruction to the access device 108 to present an indication corresponding to the detection, such that a user can be alerted (e.g., of a potential or actual device malfunction or undesirable stimulus). Example illustrations of alert communications to access device 108 are shown in FIGS. 11A and 11B.

An alert communication may include and/or correspond to, for example, an identifier of the transmitting device, an indication that a suspicious activity condition has been satisfied, a sensor reading (or processed version thereof), a threshold, an instruction to backup data, an instruction to change a setting or status, an instruction to change or remove a dependency on the transmitting device, an instruction to present an alert, and/or an instruction to change a status identifier stored at the receiving device corresponding to the transmitting device.

Transmissions may include using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. In some instances, transmissions use a low-energy protocol such that a power reserve can be conserved. When a device is transmitting one or more communications to multiple target devices, the device may or may not use the same communication protocol for each of the target devices. For example, for each of a set of target devices, a device may transmit a communication to the target device using what is estimated to be the lowest-energy communication protocol that will support successful transmission. In some examples, the alert communication is transmitted over a local area network and/or using a short-range communication channel.

The generated alert communication can be transmitted to an identified device using the identified protocol. The transmission may include a wireless transmission. The network interface 810 may also, in some instances, be configured to detect an acknowledgement communication, which may be conveyed to the alert engine 845 (e.g., such that it can avoid attempting re-transmission or influence transmission-protocol selections).

In some instances, one or more communications are transmitted to multiple target devices simultaneously or concurrently (e.g., via a broadcast transmission or multiple individual transmissions) and/or to a plurality of network devices that are part of the same network as the evaluating network device and the suspect network device. In some instances, a device transmits one or more communications to one or more target devices sequentially. For example, a device may successively send communications to a target device using increasingly higher-energy transmission protocols until the target device sends a receipt acknowledgement communication. As another example, a device may first send a communication to a target device physically near the device, subscribed to the transmitting device or having a rule that depends on a status of the device, and the device can later send a communication to a target device further from the device or without the rule. The device can send transmissions according to a priority ranking (e.g., ranking devices based on device type, proximity, user-identified priority, rule dependencies, etc.). Thus, if a battery reserve dies before all transmissions are sent, transmissions of highest priority are hopefully already sent.

In some examples, the alerts may correspond with a priority. The priority may include healing the device itself, and then intervening with the operations of other devices to fix the other abnormal operations. In another example, the priority may include transmitting a communication to the access device 108 (e.g., to inform the user) and/or alerting another network device to transmit a communication to the access device 108 on behalf of the other network devices.

At 1022, an alert communication is received. In some instances, one, more, or all of the other network devices having communicated data to the evaluating device at block 1014 receives the alert communication, though it will be appreciated that other devices may alternatively or additionally receive the alert communication.

In some embodiments, receiving the alert communication can cause a receiving device to display a presentation corresponding to the alert communication (e.g., identifying the suspect network device, a source of suspicious activity, a characteristic of the suspicious activity, and/or one or more options for changing operations within the network). Some examples of displaying a presentation corresponding to the alert communication are illustrated in FIGS. 11A-11B.

In some examples, a receiving device may follow an instruction identified in a communication, change an operation rule and/or perform a local operation in response to the alert communication. For example, in response to receiving the alert communication from the evaluating network device, a local operation of the other network device may be changed, such as disconnecting from the suspect network device, disconnecting from a network, powering off or reboot, operating in a safe mode, and the like. Other forms of local operations are available as well.

In the depicted process 1000, both a local suspicious activity condition and a distributed suspicious activity condition are evaluated. It will be appreciated that, in some instance, only a distributed condition is identified at block 1002 and one, more or all of blocks 1006-1010 is eliminated from process 1000. In such instances, blocks 1012 and 1014 may be performed by each of one or more other network devices in an unsolicited fashion.

It will also be appreciated that process 1000 may be modified to include an iterative process. For example, upon receiving one or more communications at block 1016, the evaluating device may request that one or more different network devices detect activity of the suspect device and communicate such data (thus returning the process to 1008). Such actions may allow for the evaluating device to iteratively identify a source of a problem.

In some instances, the other network device(s) independently monitor the suspect network device (e.g., at routine times or time intervals or in response to detecting an event). Communications including data corresponding to the suspect network device can be routinely sent to the evaluating network device (e.g., directly or via one or more other devices), upon determining—at the other device—that a local suspicious activity condition is satisfied, or upon request.

Further, while FIG. 10 shows a process involving other network devices, it will be appreciated that the other device may be a gateway, cloud, or access device.

In some instances, difficulties may arise with reliably transmitting an alert message across a communication path involving a suspect device. For example, a device may determine that it itself is operating suspiciously and may attempt to alert other devices, though it may be concurrently involved in transmitting so many other communications (e.g., which may be part of or a result of the suspicious activity), that an alert communication may be unable to be reliably and timely transmitted. Thus, in some embodiments, a separate communication path can be reserved for high-priority communications. The separate communication path can include, for example, a distinct communication channel or a separate queue. For example, a device can transmit any communications on a high-priority queue prior to transmitting communications on a normal queue. Alert communications (e.g., notifying one or more other devices that a suspicious-activity condition is satisfied for the transmitting device or a third device) can be handled in a manner (e.g., having a priority tag or communication-path identifier) so as to route such communications to the high-priority queue and to thereby reliably transmit the communications. In some instances, the high-priority queue and/or separate communication path can also handle emergency notifications, such as those to 911 destinations.

Figure 11C:
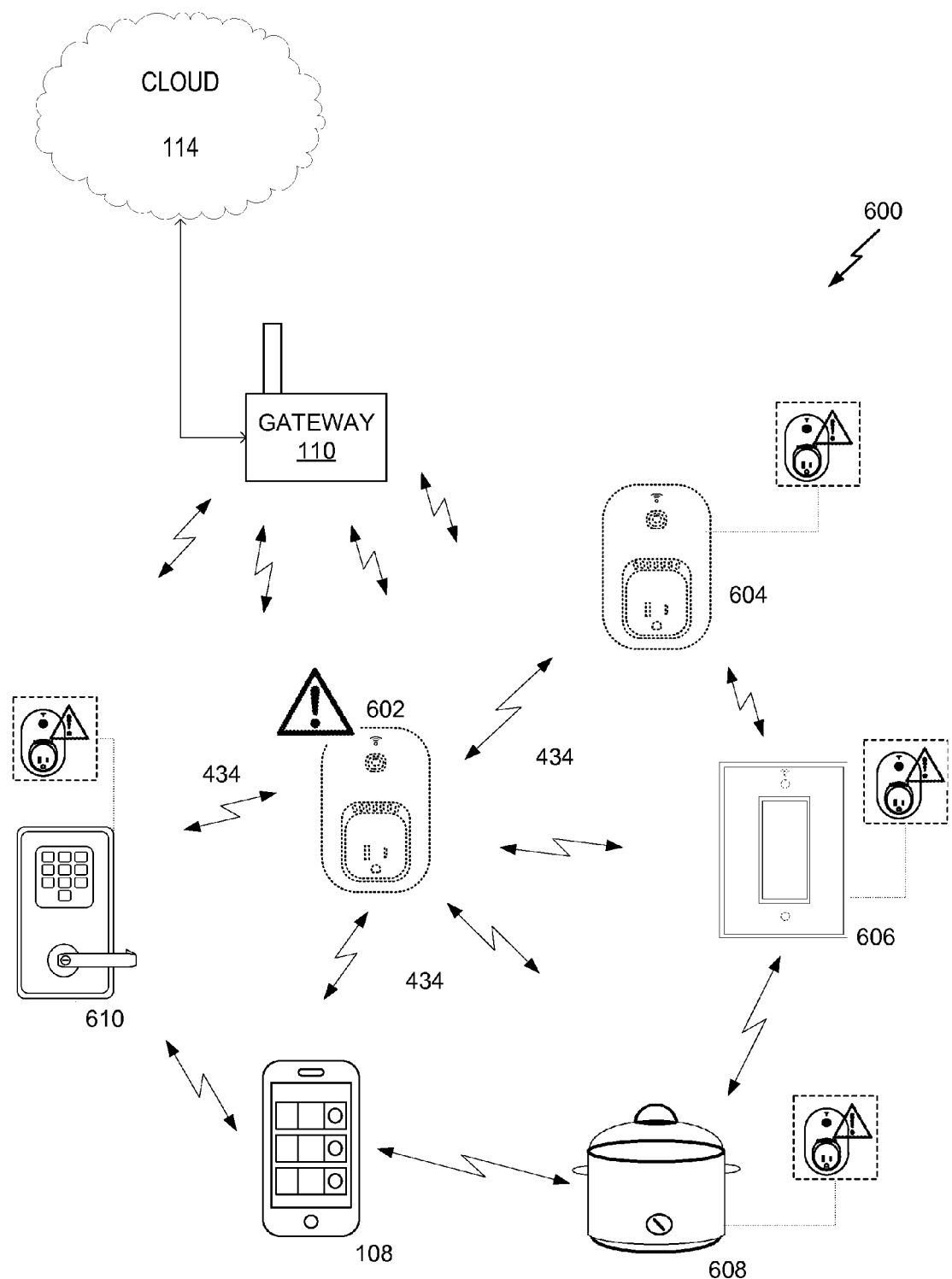

FIGS. 11A-C are illustrations of example alert communications in a network environment, in accordance with some embodiments. FIG. 11A illustrates a display on an access device that provides an alert communication for a user. For example, the display 1100 includes modular tiles 1102A, 1102B, 1102C, 1102D, and 1102E (hereinafter tiles "1102") for interacting with network devices in a network (e.g., network devices 602, 604, 606, 608, and 610 shown in FIGS. 6-7). In an embodiment, the display 1100 is provided on access device 108, which can be touch sensitive (i.e., touch screen). For ease of explanation, the monitoring and control operations discussed are described in the context of an application executing on access device 108 with a touch-screen display device. However, the operations are not intended to be limited to access device 108.

The interactions can include monitoring and controlling the network devices. The tiles 1102 each include respective icons 1104A, 1104B, 1104C, 1104D, and 1104E (hereinafter "icons 1104") and respective names 1106A, 1106B, 1106C, 1106D, and 1106E (hereinafter "names 1106") identifying the different network devices. For example, tile 1102A corresponds to outlet 602, tile 1102B corresponds with outlet 604, tile 1102C corresponds with light switch 606, tile 1102D corresponds with slow cooker 608, and tile 1102E corresponds with door lock 610.

In some embodiments, tiles 1102 are customizable by users, developers, and/or manufacturers of the network devices. For example, name 1106A is customized to indicate the name of a specific type of outlet (e.g., "outlet 602" or "outlet by the bed stand"). Tile 1102A also includes an interactive element 1108A that can be selected to control the outlet. For example, interactive element 1108A can be selected with a click or press to turn the outlet on and off. Tiles 1102B and 1102C also include similar interactive elements 1108B and 1108C, respectively, to turn the corresponding network devices on and off.

In additional or alternative embodiments, tiles 1102 can convey status information about a network device, including, but not limited to, a firmware version, a last known firmware update status, connectivity to cloud status, registration status (e.g., an indication that the network device has a key or does not), a primary mode of the network device (e.g., on, off, etc.), a secondary mode of the device (e.g., standby, high, low, eco, etc.), a schedule, and settings for the device.

Depending on the type and capabilities of a network device, the tile 1102 can display a status or state 1110 of the device (e.g., status 1110A and 1110C). For example, the state or status 1110A in tile 1102A of outlet 602 can display an alert communication and/or other notification that a suspicious activity condition is satisfied. Similarly, the status 1110C in the tile 1102C for the light switch network device can indicate a brightness level for the lamp that operates in response to activation of the light switch. Status 1110C can also indicate that the lamp is at 0%, which corresponds to the lamp being turned off. In an embodiment, this status is also reflected by the power button 1108C for the lamp not being lit up or shaded/bolded. When a network device has extended capabilities, such as secondary or tertiary functionalities, an interactive element 1112 can be selected to expand and contract a menu including controllable settings for the capabilities. The menu can be, for example, a full drop down menu or drawer with interactive elements for operating the extended capabilities of the network device.

Display 1100 can include selectable icons and links 1114, 1116, 1118, 1120, 1122, and 1124 outside of the tile display area. For example, refresh icon 1114 can be selected to refresh information presented in display 1100, such as status and state information displayed in tiles 1102. For instance, the alert status 1110A in tile 1102A for outlet 602 and/or the brightness status 1110C in tile 1102C for the lamp can be updated when refresh icon 1114 is selected. The edit link 1116 can be selected to edit the list of tiles 1102. For example, edit link 1116 can be selected to sort or re-order the sequence of tiles 1102. Edit link 1116 can also be selected to delete one of the tiles 1102 in cases where a user no longer wants to view a given tile. Devices icon 1118 can be selected to list discovered network devices in a network.

Rules icon 1120 can be selected to display rules pertaining to network devices. For example, a user can create or edit a rule that turns on a light (e.g., associated with light switch 606, plugged into outlet 602, etc.). The rule may be based in part on a time frame or duration, where the rule turns on the light for a certain number of minutes when a motion sensor detects motion. In this way, rules can relate functionalities of multiple network devices to each other. News icon 1122 can be selected to review news items, such as news associated with network devices and/or the application. For instance, news icon 1122 can be selected to view announcements and news items relevant to network devices controlled via tiles 1102 and/or information relevant to the application, such as notifications of available tile updates. The more icon 1124 can be selected to access additional features of the application.

FIG. 11B illustrates an example interface for providing the alert communication. The indication of the suspicious activity may be provided after the activity of the network device associated with the suspicious activity is detected. As illustrated, display 1150 may be similar to display 1100 described with FIG. 11A and the indication of the conflict may be a message overlaid on display 1100.

The alert communication may be transmitted when one or more network devices determine that the suspicious activity condition is satisfied (e.g., at a cloud-based device, at a network device in network 600, etc.). For example, a network device may identify a suspicious activity condition and detect activity associated with the suspicious activity condition at a particular network device (e.g., performed by itself or another network device). The evaluating network device can perform the analysis, determine that the suspicious activity condition is satisfied, and/or transmit the alert communication to an access device. The alert communication of the conflict may be transmitted to the computing device (e.g., access device 108), user device (e.g., a cellular phone), or any other suitable device as a message. In some embodiments, the message can be provided through other means, including transmitting the message to a user device as a text message or Short Message Service (SMS), email message, audible message, or other suitable message format. In some embodiments, no message is transmitted if the computing device performing the analysis is the same computing device providing the indication of the conflict.

As seen in FIG. 11B, the display 1150 may display an alert communication 1160 of the conflict. The alert communication 1160 can include content related to the suspicious activity. As illustrated, the message includes "It looks like Outlet 602 in your network is associated with some suspicious activity. Particularly, Outlet 602 has been turning on and off repeatedly throughout the day, so we deactivated Outlet 602 to prevent it from damaging the electronic device that is plugged into it." The user may respond to the message by selecting "no, let it turn on/off" to confirm that the suspicious activity is acceptable or "Thanks! Keep it off" to turn the suspect network device off.

FIG. 11C illustrates an alert notification at one or more network devices 604, 606, 608, and 610. For example, the network interface 810 may transmit the alert communication to the network device 604 (e.g., via WiFi, via an ad hoc network, etc.). Network device 604 may receive the alert via its network interface and/or store data from the alert in a detected activity data store, cache, or other location. Some or all of the network devices may receive or send the alert notification. In some examples, the access device 108 may also receive the alert notification (e.g., visible through a display or other interface).

Figure 12:
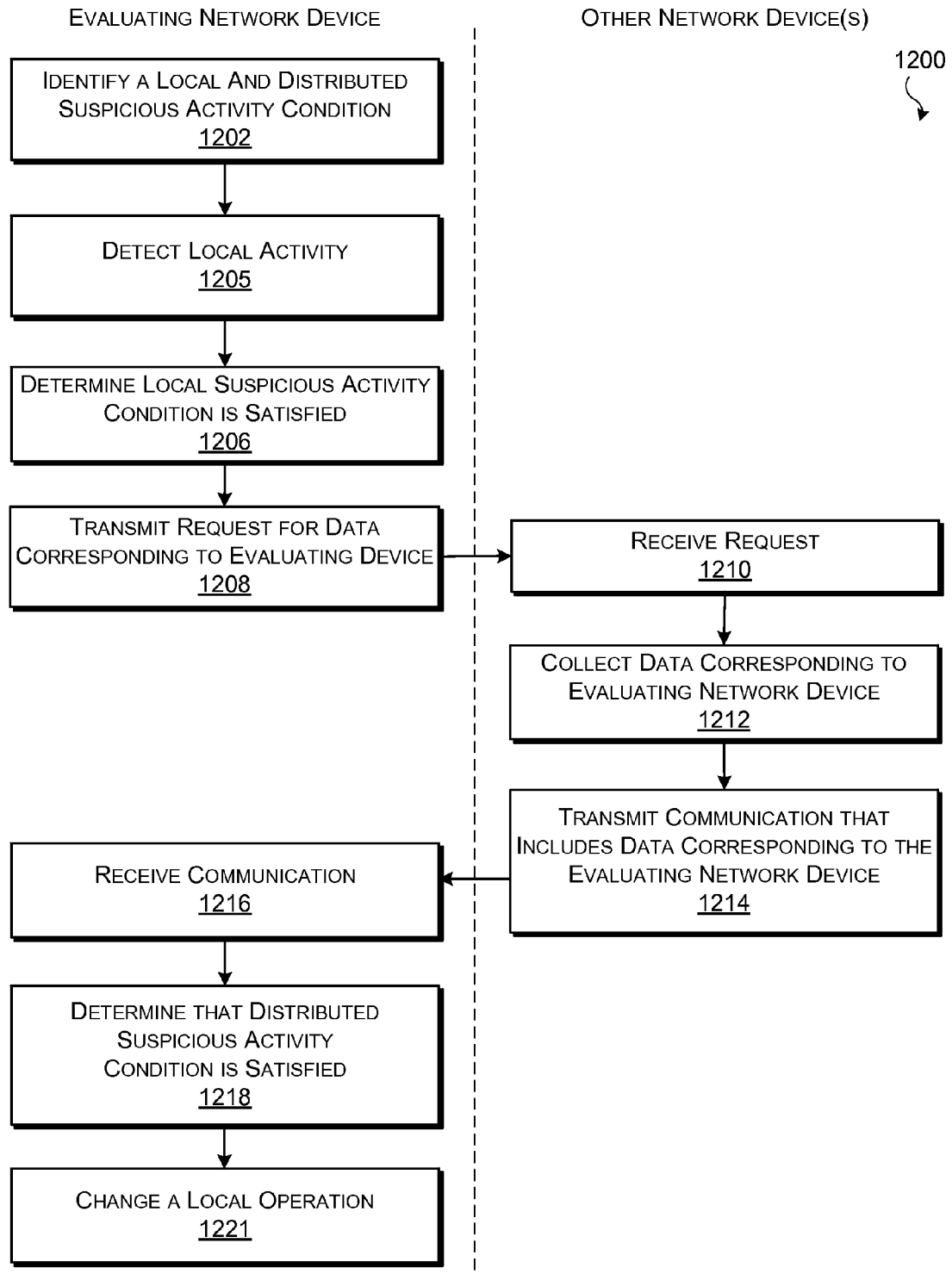
FIG. 12 is a flowchart illustrating an embodiment of detecting abnormal network device operation, in accordance with some embodiments.

FIG. 12 is a flowchart illustrating an embodiment of detecting local abnormal network device operation, in accordance with some embodiments. Process 1200 can be performed in part or in its entirety at a network device.

Various blocks in process 1200 can parallel similarly numbered blocks in process 1000. While brief exemplary details are provided below with respect to various blocks, it will be appreciated that detail provided with respect to corresponding blocks in process 1000 may be additionally or alternatively applicable.

In process 1200, rather than detecting activity of a distinct suspect network device, the evaluating device detects local activity, which can include activity of one or more components of the evaluating device itself or of the evaluating device as a whole. The types of activity detected at block 1205 may be similar to or the same as the types of activity detected at block 1004 or may be different. For example, the evaluating device may be able to access more information when detecting local activity as opposed to activity of another device (e.g., such that it could monitor sensor readings, device component performance characteristics, memory usage, received communication characteristics, and so on, which may not be detectable to other devices). In some examples, detecting the local activity can include identifying a value corresponding to a transmission frequency or resource usage (e.g., CPU, network, memory or storage usage). For example, the value can include an indication as to whether a device component (e.g., a CPU) is performing any activity, which activities a device component is performing, whether a device component is responsive, and/or whether or to what extent the activity is being properly performed (e.g., a write and/or read activity). In some examples, detecting the activity includes detecting power provided to the device.

Accordingly, it will be appreciated that the local suspicious activity condition identified at block 1202 and determined to be satisfied at block 1206 may also be the same as, similar to, or different than the local suspicious activity condition identified at block 1002 and determined to be satisfied at block 1006. The local suspicious activity condition involved in process 1200 can involve, for example, a different (or additional) activity parameter and/or variable, a different threshold or range, and/or a different clustering technique. As indicated above, the local suspicious condition may be identified using, for example, a learning technique, based on user input, based on a device setting, etc.

Similarly, in some instances a distributed suspicious activity condition can relate to activity detected by the evaluating device. Accordingly, it will be appreciated that the distributed suspicious activity condition identified at block 1202 and determined to be satisfied at block 1218 may also be the same as, similar to or different than the distributed suspicious activity condition identified at block 1002 and determined to be satisfied at block 1018.

At 1208, the evaluating network device transmits a request for data to one or more other network devices, each of which receives the request at block 1210. The request may request data that corresponds to the evaluating network device. For example, the request may request an indication as to how frequently the other device is receiving communications from the evaluating device or a sensor measurement at the other device (so as to provide allow the evaluating device to compare a corresponding measurement). The request and receipt of the request may substantially parallel blocks 1008 and 1010, respectively.

At 1212, each of the one or more other network devices collects data corresponding to the evaluating network device. The collection can relate to communications received at the other device from the evaluating device (e.g., to detect a frequency of transmissions, a latency since a last transmission or a number or presence of one or more communications indicative of sensor readings inconsistent with those collected at the other device). The data may relate to a setting or sensor reading of the other device, so as to provide for an evaluation of consistency with that at the evaluating device. The collected data may be of a type identified in the request received at block 1210. The data collected at block 1212 may be of a same or similar type to that detected at block 1205. The data detected at block 1212 may correspond to a type of data evaluated by the distributed suspicious activity condition and/or that corresponding to activity and/or data of interest as identified in the request. The detection may substantially parallel block 1012.

At 1214, each of the one or more other network devices generates and transmits a communication to the evaluating network device. The communication includes the data collected at block 1212. At 1216, the evaluating network device receives the communication from each of the one or more other network devices.

At block 1218, the evaluating device used the data in the communication(s) to determine that a distributed suspicious activity condition is satisfied. Depending on the embodiment, the determination may, or may not, also be based on the local activity detected at block 1205. Block 1218 can include, for example, comparing one or more values (e.g., in the data) or a processed version thereof (e.g., an average across other devices) to a respective threshold, determining whether one or more values (e.g., in the data) or a processed version thereof are within a respective range, or determining whether one or more other-device values (e.g., a numeric or categorical value of a sensor reading, input or setting) or a processed version thereof is sufficiently consistent with an evaluating-device value (e.g., an exact match or within a defined percentage or absolute amount).

At 1221, the evaluating device changes a local operation. In some instances, a local operation at the network device may be changed to help resolve the abnormal network device operation without user interaction, to reduce a network influence of suspicious activity, to reduce a possibility of damaging the evaluating network device and/or another network device, to preserve data on the evaluating network device, etc. Changing the local operation can include, for example, powering off or rebooting, transmitting an alert communication, turning off an ability to transmit communications or data, quarantining the suspect network device, implementing a new operation, ceasing implementation of an existing operation, changing a setting of the device (e.g., to a default or safe setting, such as a locked or secure setting), terminating one or more current processes, and/or initiating a rule for itself.

In some examples, the severity and/or type of a detected suspicious activity may identify which local operation to change. Additionally or alternatively, which local and/or distributed conditions were determined to have been satisfied and/or a magnitude of a comparison result involved in such determination (e.g., an extent to which an activity parameter exceeded a threshold) may identify which local operation to change. For example, when the suspicious activity identifies that a large amount of data is transmitted to a suspicious IP address (e.g., indicating malware), certain functionality at the network device may be disabled to immediately stop the data transmissions. Lower priority changes may include reinstalling an operating system, removing the application that is transmitting the data, running a malware scan on the network device, and other operations that may help prevent the suspicious activity and/or loss of data. In another example, the local operation may correspond with quarantining the suspicious network device.

One type of local operation can commit device data to a memory. The device can include another (e.g., volatile) memory that is used in other circumstances (e.g., to store current and/or historical device settings, sensor data, local statuses, statuses of other devices, etc. when the condition is not satisfied). The memory can include one for which writing capability and/or speed is limited and/or deteriorates across repeated usages. The memory can include a local memory present in the device and/or a non-volatile memory (e.g., a flash memory, programmable read-only memory, erasable programmable read-only memory, electrically erasable programmable read-only memory, ferroelectric random access memory, non-volatile random access memory, bubble memory, or magnetoresistive random access memory) that does not require power for access to the memory, and/or a low-power memory for which less power is required to write data to the memory than required for traditional RAM writing. The memory can be a reserve memory such that it is not routinely used to store data. For example, in some instances, data is written to the memory only when a suspicious activity condition is satisfied. In some examples, the network device stores data from a location at the network device to a different location at the network device or at another network device on the same network.

Other forms of local operations are available as well. For example, data backup and/or transmissions can be performed using a power reserve, such as a battery in the network device. In another example, the network device stores data from a location at the network device to a different location at the network device or at another network device on the same network. Thus, even if the device is damaged or isolated to a point of no longer receiving AC power and/or no longer having capabilities to write to a default memory, the device can nonetheless preserve select data. In another example, a rule affecting a local operation at a network device can be amended. For example, the rule can instruct the motion sensor network device to transmit a notification and/or communication to a light switch network device when motion is sensed. The communication may instruct the light switch to turn on the light. When the suspicious activity corresponds with the light toggling on and off in response to the rule, the rule may be deactivated, canceled, modified, or deleted to help prevent the suspicious activity from recurring (e.g., causing the rule not to depend on the motion sensor network device for a particular time period).

Figure 13:
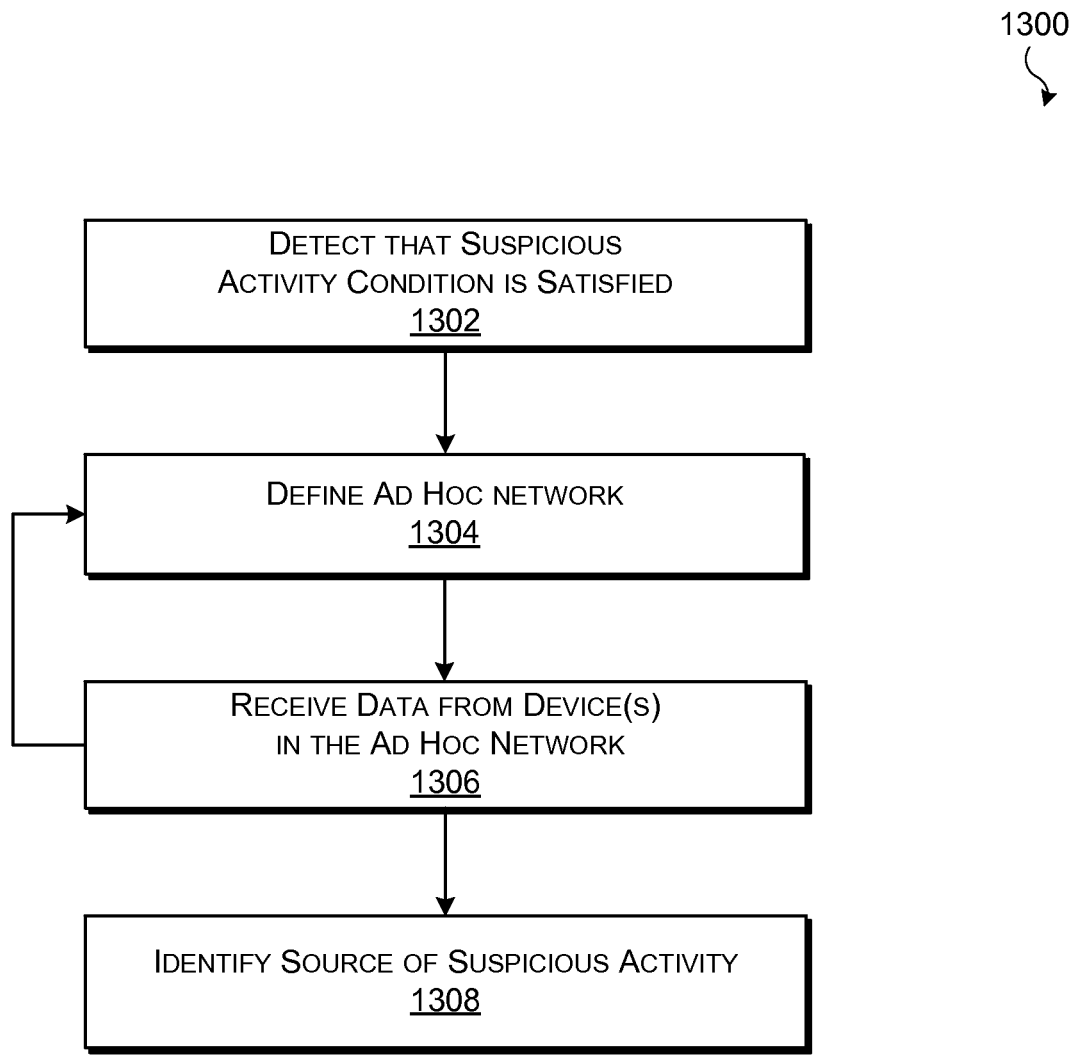
FIG. 13 is a flowchart illustrating an embodiment of defining an ad hoc network, in accordance with some embodiments.

FIG. 13 is a flowchart illustrating an embodiment of defining an ad hoc network, in accordance with some embodiments. Process 1300 can be performed in part or in its entirety at a network device.

At 1302, an evaluating device detects that a suspicious activity condition is satisfied. The suspicious activity condition can be a local and/or distributed condition, such as one(s) identified at block 1002 or 1202, and one or both of these conditions may be determined to be satisfied at one or more of blocks 1006, 1206, 1018, and 1218. One or more communications may be transmitted and received throughout the network in order to determine that the suspicious activity condition is satisfied, as described throughout process 1000 and/or 1200.

It will be appreciated that a suspiciously acting device may, but need not, be the source of a problem. For example, another network device, a gateway, a cloud server, an access device, a local power supplier, or a breaker may cause the problem. For example, an access device may repeatedly send communications to the suspect device with setting-change instructions. The suspect device may then proceed to operate in an abnormal manner by frequently changing its setting and alerting other devices of the setting changes, though the suspect device itself may be functioning appropriately. As another example, a problem with a power utility may cause a light to flicker. The suspect device may detect the flicker and determine that motion is occurring according to a motion-detection algorithm. To estimate a source of a problem (e.g., to a particular device or to determine whether it is in or out of the network), one or more ad hoc networks can be defined and used to identify which devices are involved in and/or perceiving the problem.

At 1304, an ad hoc network is defined. Defining the ad hoc network can include identifying which devices are in the ad hoc network. The ad hoc network can include, for example, some or all network devices, gateway devices, cloud servers, and/or access devices associated with a network or an incomplete subset thereof. The incomplete subset be selected by, for example, identifying devices located within a particular area (e.g., room, floor, or distance from a suspect device), of one or more particular types (e.g., a same type as a suspect device), having an operation at least partly controlled (e.g., via a rule) by a suspect device, for which an operation of a suspect device at least partly depends upon (e.g., via a rule), or configured to detect activity of a suspect network device. The selection can depend on a characteristic or identity of an identified suspect device and/or which suspicious activity condition was determined to have been satisfied. The ad hoc network may be defined to include, or in other embodiments to exclude, the suspect device and/or an evaluating device having detected that a suspicious activity condition was satisfied at block 1302.

The ad hoc network can include one or more network devices that are selected based on a situation and/or are part of a standard network. For example, a light switch network device may detect that it itself is operating suspiciously due to power toggling on and off, and form an ad hoc network with other network devices that are in a same room, within 10 feet of the light switch network device, in a same home or building, etc.

In another example, the light switch network device may detect a suspicious activity (e.g., an Internet connection through the gateway 110 turned off an hour ago), and communicate with an initial set of network devices to determine if those network devices experienced the same suspicious activity during the same time frame (e.g., a random set, alphabetical set, the closest network device(s), etc.). If so, the ad hoc network can be formed with all of the other network devices that experienced the same suspicious activity during the same time frame identified in the initial communication. In another example, the light switch network device forms an ad hoc network with other network devices involved in a previous corresponding suspicious activity (e.g., having also detected the activity, having been a cause of the previous suspicious activity, etc.). The communications within the ad hoc network can transmit data (e.g., to determine the source of the activity, to confirm that the activity is not internal and experienced by other network devices, etc.).

At 1306, data is received from each device in the ad hoc network. In some instances, upon defining the ad hoc network, a request for data is sent to each device in the ad hoc network. The request can identify a requested type of data, the suspicious activity condition that was satisfied, activity and/or data used to determine that the condition was satisfied, and/or a suspect device. In some instances, the data is sent independently from having received a request. For example, devices in a network may distribute detection of satisfaction of a local suspicious activity condition (e.g., identifying itself and/or the suspect device) to some or all other devices in the network. As another example, devices may routinely monitor activity of devices involved in device-pertinent rules (e.g., such that the monitoring device's operation can depend on the monitored device), and results of such monitoring can be transmitted to one or more other devices (e.g., a gateway device). A device performing process 1200 can then simply determine which of such communications to consider at a given time.

The data can, for example, pertain to a local operation of the ad-hoc network device and/or data pertaining to another device. The data can correspond to a type of data evaluated by a suspicious activity condition and/or a type of data used to determine that a suspect device was performing suspiciously. In some instances, the data can include an identification of one or more devices, such as an identification of each device sending more than five communications to the ad-hoc network device in a minute or having been unresponsive to a communication sent by the ad-hoc network device. The data can relate to a sensor reading or component operation, such as a detected light intensity, an available memory size, or whether motion has been detected within the last 15 seconds.

The data can be transmitted via the communication infrastructure using communications transmitted between the devices on the network (e.g., to determine the source of the activity, to confirm that the activity is not internal and experienced by other network devices, etc.). The data can include any type of information gathered in the network, including network device identifiers, an identification of suspect network device(s), time of day (e.g., when communications are transmitted or states are changed, etc.), frequency of communications between the devices, variety of states or statuses of a network device, the duration or frequency of each state or status, interaction history between the network devices, power requirements, and the like. In some embodiments, a pattern of data may be identified and/or accessed from the data.

Depending on the embodiment, process 1300 can then return to block 1304 to redefine the ad hoc network. For example, the process can return to block 1304 when available data is not yet indicative of a source of a suspicious activity problem and/or if it is estimated that collecting data from devices in a different ad hoc network can improve a localization effort.

Upon returning to block 1304, a different ad hoc network can be defined. The different ad hoc network can include, for example, one or more devices not in a previous ad hoc network (and may, or may not, include one or more devices that were in the previous ad hoc network). The different ad hoc network can include fewer, a same number, or more devices that in the previous ad hoc network. An analysis of the data received from devices in the previous ad hoc network may influence which devices are to be included in the different ad hoc network. For example, the ad hoc network may include devices with a characteristic (e.g., location or device type) corresponding to those devices in a previous ad hoc network that detected local or remote suspicious activity. In some instances, the data can indicate that one or more other devices are operating suspiciously, and the ad hoc network can then include devices that provide operation-controlling input to these new suspect devices and/or that share a characteristic with one, more, or all of the new suspect devices.

For example, a first ad hoc network can include all network devices in a room where a suspect device is located. The data may indicate that all of these devices in the room are behaving suspiciously. A second ad hoc network may then include all network devices in a floor of a house (e.g., and may, or may not, exclude those in the first ad hoc network), and data may indicate that all network devices are behaving suspiciously. A third ad hoc network may then include all network devices in a house. Data may indicate that devices on other floors are operating normally. This iterative approach may thus include an intelligent technique for identifying all devices with abnormal operations.

At 1308, a source of suspicious activity can be identified. The source can include a particular device or an event, such as a power outage. It will be appreciated that the identifying the source can include generating a prediction as to what is a source. The source can be identified, for example, by identifying a shared characteristic between those devices exhibiting and/or detecting suspicious activity that is not shared by other devices. For example, it may be determined that all suspiciously acting devices (but not other devices) are in communication with a particular gateway device or are in a same rule. Identifying the source can include evaluating relationships between suspiciously acting devices. For example, if Device A provides input to Devices B and C that control their operation, if all three devices are acting suspiciously, Device A may be identified as a source of the problem.

It will also be appreciated that, in some instances, process 1300 may be modified to remove the iterative process. If a source of a problem is determined to be a source device, the source device can be, for example, quarantined from the rest of a network (e.g., by changing settings on the source device and/or other devices), shut down, put into safe mode or rebooted. Quarantining the device may include, for example, ceasing transmissions from the source device to other devices, changing or removing rules that indicate that one or more other devices' operation is to depend on the source device, and/or changing or removing rules that indicate that one or more other devices (e.g., an operation, detection or sensor reading thereof) are to influence operation of the source device. In some instances, one or more devices can be quarantined from the source. For example, one or more devices on a faulty breaker may begin using battery power and break a circuit to the breaker.

In some instances, upon identifying a source, data pertaining to the source can be periodically or continuously collected and analyzed to determine if the problem remains. For example, such monitoring can serve to identify when a power instability is resolved. Further, while FIG. 13 shows a process involving other network devices, it will be appreciated that data can also be obtained from devices not associated with the network. For example, a device performing the process can communicate over the Internet to determine if there is a local power outage or severe weather condition.

Figure 14A:
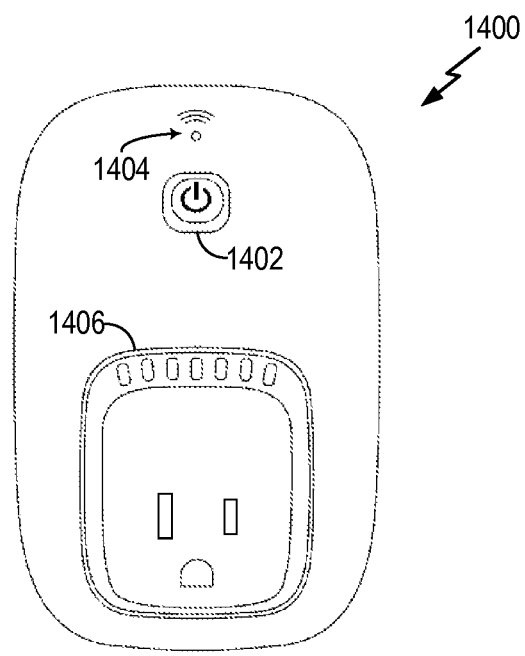
FIG. 14A is an illustration of an example of a front view of a network device, in accordance with an embodiment.
Figure 14B:
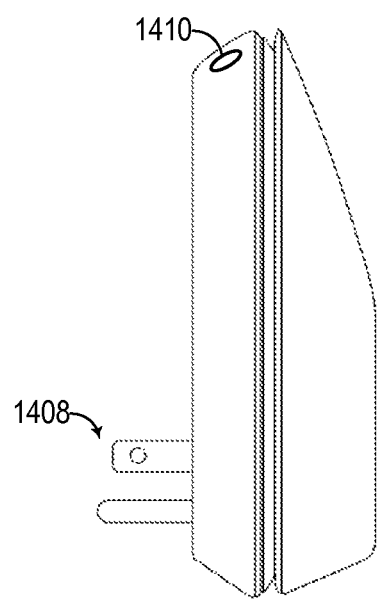
FIG. 14B is an illustration of an example of a side view of a network device, in accordance with an embodiment.

FIG. 14A illustrates an example of a front view of a network device 1400. FIG. 14B illustrates an example of a side view of the network device 1400. The network device 1400 may include any of the network devices 102, 104, or 106 described herein. In some embodiments, the network device 1400 may be a home automation network device. For example, the network device 1400 may include a home automation switch that may be coupled with a home appliance. A user may wirelessly access the network device 1400 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1400 may include a WiFi enabled switch that connects home appliances and other electronic devices to a compatible 802.11b/g/n/ac WiFi network. The network device 1400 may thus allow users to locally or remotely turn devices on or off from anywhere, program customized notifications, and/or change device status. The network device 1400 may further allow a user to create custom schedules or have devices respond to sunrise or sunset.

The network device 1400 includes an power switch 1402 that may be depressed in order to turn the network device 1400 on and off. In some embodiments, a light source may be integrated with or located behind the power switch. For example, a light-emitting diode (LED) may be located on a circuit board under the power button 1402. The light source may be illuminated when the network device 1400 is powered on, and may not be illuminated when the network device 1400 is powered off.

The network device 1400 further includes a communications signal indicator 1404. The signal indicator 1404 may indicate whether the network device 1400 has access to a communications signal, such as a WiFi signal. For example, the signal indicator 1404 may include a light source (e.g., a LED) that illuminates when the network device 1400 is connected to a communications signal. The light source may depict different colors or other characteristics (e.g., flashing, dimming, or the like) to indicate different levels of signal strength or mode of operation.

The network device 1400 includes a restore button 1410. The restore button 1410 may allow a user to reset the network device 1400 to factory default settings. For example, upon being depressed, the restore button 1410 may cause all software on the device to be reset to the settings that the network device 1400 included when purchased from the manufacturer.

The network device 1400 further includes a plug 1408 and an outlet 1406. The plug 1408 allows the network device 1400 to be plugged into a wall socket, such as a socket providing 120V, 220V, or the like. In turn, an appliance may be plugged into the outlet 1406. Once the network device 1400 is registered according to the techniques described above, an appliance plugged into the socket 1406 may be controlled by a user using an access device (e.g., access device 108).

Figure 15:
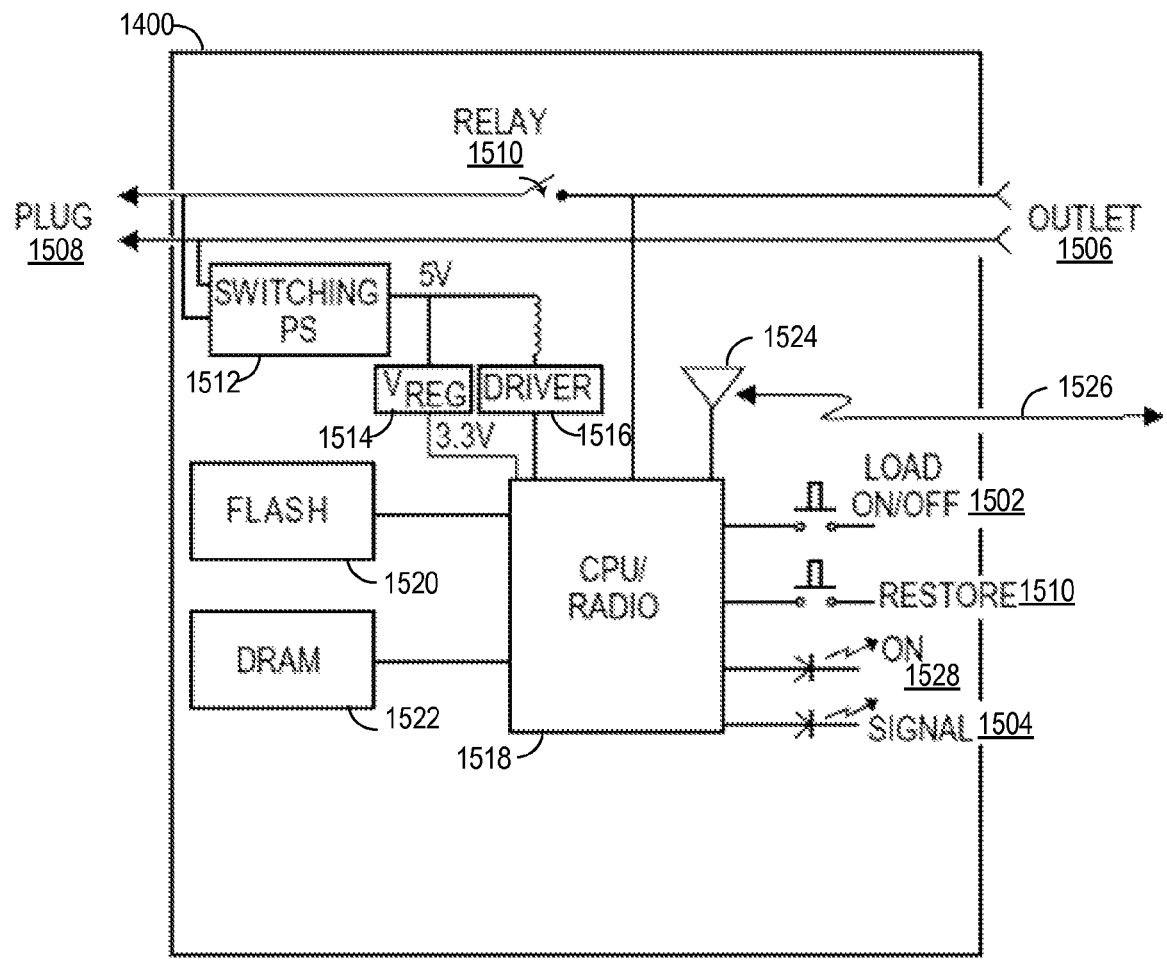
FIG. 15 is an example of a block diagram of a network device, in accordance with an embodiment.

FIG. 15 is an example of a block diagram of the network device 1400 depicting different hardware and/or software components of the network device 1400. As described above with respect to FIGS. 14A and 14B, the network device 1400 includes the outlet 1406, the plug 1408, the power button 1402, the restore button 1410, and the communications signal indicator 1404. The network device 1400 also includes light source 1528 associated with the power button 1402. As previously described, the light source 1528 may be illuminated when the network device 1400 is powered on.

The network device 1400 further includes a relay 1510. The relay 1510 is a switch that controls whether power is relayed from the plug 1408 to the outlet 1406. The relay 1510 may be controlled either manually using the power button 1402 or remotely using wireless communication signals. For example, when the power button 1402 is in an ON position, the relay 1510 may be closed so that power is relayed from the plug 1408 to the outlet 1406. When the power button 1402 is in an OFF position, the relay 1510 may be opened so that current is unable to flow from the plug 1408 to the outlet 1406. As another example, an application or program running on an access device may transmit a signal that causes the relay 1510 to be opened or closed. For instance, an access application may display a graphical interface on the access device that includes a power button. The user may tap or otherwise select the power button, and the access application may send a communication signal (e.g., over a WiFi network) to the network device 1400 instructing the network device 1400 to open or close the relay 1510.

The network device 1400 further includes flash memory 1520 and dynamic random access memory (DRAM) 1522. The flash memory 1520 may be used to store instructions or code relating to an operating system, one or more applications, and any firmware. The flash memory 1520 may include nonvolatile memory so that any firmware or other program can be can updated. In the event the network device 1400 loses power, information stored in the flash memory 1520 may be retained. The DRAM 1522 may store various other types of information needed to run the network device 1400, such as all runtime instructions or code.

The network device 1400 further includes a CPU/Radio 1518. The CPU/Radio 1518 controls the operations of the network device 1400. For example, the CPU/Radio 1518 may execute various applications or programs stored in the flash memory 1520 and/or the dynamic random access memory (DRAM) 1522. The CPU/Radio 1518 may also receive input from the various hardware and software components, interpret the input, and perform one or more functions in response to the input. As one example, the CPU/Radio 1518 may determine whether the power button 1402 has been pressed, and determines whether the relay 1510 needs to be opened or closed. The CPU/Radio 1518 may further perform all communications functions in order to allow the network device 1400 to communicate with other network devices, one or more gateways, a cloud network, and/or one or more access devices. While the CPU and radio of the network device 1400 are shown to be combined in the CPU/Radio 1518, one of ordinary skill in the art will appreciate that, in some embodiments, the CPU and radio may be separately located within the network device 1400. For example, CPU circuitry may be situated at a separate location on a circuit board from the location of radio circuitry, the CPU circuitry may be located on a different circuit board from the radio circuitry, or the like. Further, the network device 1400 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 1400 does not include a cellular network transceiver radio or interface, and thus may not be configured to directly communicate with a cellular network. In some embodiments, the network device 1400 may include a cellular network transceiver radio, and may be configured to communicate with a cellular network using the cellular network transceiver radio.

The network device 1400 may communicate with other devices and/or networks via antenna 1524. For example, antenna 1524 may include a 2.4 GHz antenna, a 5 GHz antenna, or the like, that can transmit and receive WiFi communications signals. The network device 1400 may include other types of antennas that can communicate Bluetooth® signals, Zigbee® signals, Ultra-Wideband (UWB) signals, WiFi-Direct signals, BLE signals, and/or the like. In some embodiments, the antenna 1524 may be configured to communicate different types of signals, such as the WiFi signals, Bluetooth® signals, Zigbee® signals, UWB signals, WiFi-Direct signals, BLE signals, and/or the like. In some embodiments, the network device 1400 may include multiple antennas for communicating the different types of communication signals. As one example, the network device 1400 may include both a 2.4 GHz antenna and a 5 GHz antenna.

The network device 1400 further includes a driver 1516, a switching power supply 1512, and a voltage regulator 1514. The driver 1516 may include instructions or code that can be used to translate control signals or commands received from applications running on the DRAM 1522 to commands that the various hardware components in the network device 1400 can understand. In some embodiments, the driver 1516 may include an ambient application running on the DRAM 1522. The switching power supply 1512 may be used to transfer power from the outlet in which the plug 1408 is connected to the various loads of the network device 1400 (e.g., CPU/Radio 1518). The switching power supply 1512 may efficiently convert the voltage and current characteristics of the electrical power to a level that is appropriate for the components of the network device 1400. For example, the switching power supply 1512 may perform AC-DC conversion. In some embodiments, the switching power supply 1512 may be used to control the power that is relayed from the plug 1408 to the outlet 1406. The voltage regulator 1514 may be used to convert the voltage output from the switching power supply 1512 to a lower voltage usable by the CPU/Radio 1518. For example, the voltage regulator 1514 may regulate the DC voltage from 5V to 3.3V.

In various embodiments, functions may be stored as one or more computer-program products, such as instructions or code, in a non-transitory machine-readable storage medium, such as the flash memory 1520 and/or the DRAM 1522. The network device 1400 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 1520 and/or the DRAM 1522, may be a processor-readable memory and/or a computer-readable memory that stores software code (programming code, instructions, etc.) configured to cause a processor(s) within the CPU/Radio 1518 to perform the functions described. In other embodiments, one or more of the functions described may be performed in hardware.

A set of these instructions and/or code might be stored on a non-transitory machine-readable storage medium, such as the flash memory 1520 and/or the DRAM 1522. In some cases, the storage medium might be incorporated within a computer system, such as the CPU/Radio 1518. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 1400 and/or might take the form of source and/or installable code, which, upon compilation and/or installation on the network device 1400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 1400 may have other components than those depicted in FIGS. 14-15. Further, the embodiment shown in the figures are only one example of a network device that may incorporate an embodiment of the invention. In some other embodiments, network device 1400 may have more or fewer components than shown in the figure, may combine two or more components, or may have a different configuration or arrangement of components.

Figure 16:
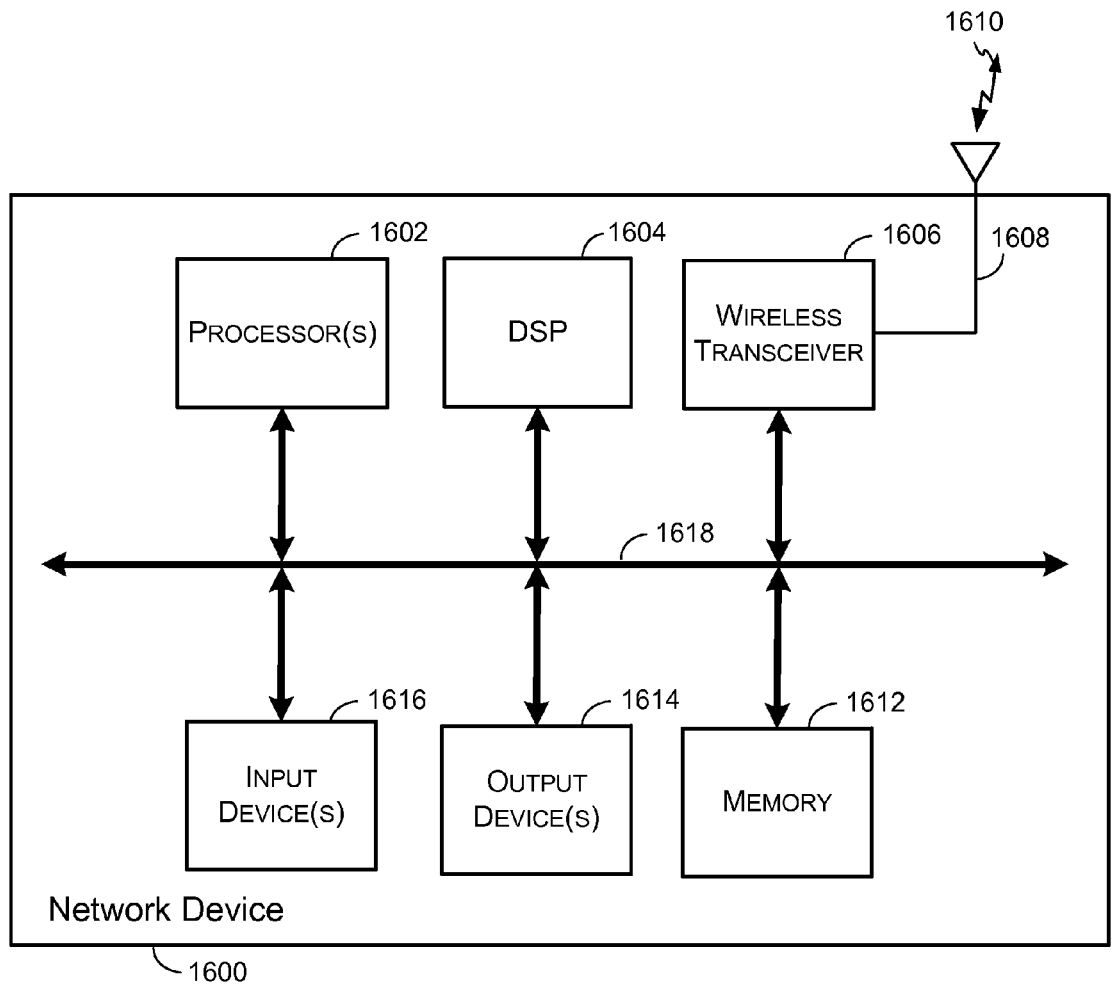
FIG. 16 is a block diagram illustrating an example of an access device, in accordance with some embodiments.

FIG. 16 illustrates an example of an access device 1600. The access device 1600 may include any human-to-machine interface with network connection capability that allows access to a network. For example, the access device 1600 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1600 includes hardware elements that can be electrically coupled via a bus 1618 (or may otherwise be in communication, as appropriate). In one embodiment, the bus 1618 can be used for the processor(s) 1602 to communicate between cores and/or with the memory 1612. The hardware elements may include one or more processors 1602, including without limitation one or more general-purpose processors and/or one or more special-purpose processors (such as digital signal processing chips, graphics acceleration processors, and/or the like); one or more input devices 1616, which can include without limitation a camera, a mouse, a keyboard, a touch sensitive screen, a touch pad, a keypad, and/or the like; and one or more output devices 1614, which can include, without limitation, a display, a printer, and/or the like.

The access device 1600 may include one or more wireless transceivers 1606 connected to the bus 1618. The wireless transceiver 1606 may be operable to receive wireless signals (e.g., signal 1610) via antenna 1608. The wireless signal 1610 may be transmitted via a wireless network. In some embodiments, the wireless network may be any wireless network including but not limited to a wireless local area network (e.g., local area network 100), such as WiFi, a Personal Access Network (PAN), such as Bluetooth®, Zigbee®, or UWB, or a wide area network, such as a cellular network (e.g. a GSM, WCDMA, LTE, CDMA2000 network), a cloud network, the Internet, or other network. Wireless transceiver 1606 may be configured to receive various radio frequency (RF) signals (e.g., signal 1610) via antenna 1608 from one or more gateways, network devices, other access devices, cloud networks, and/or the like. Access device 1600 may also be configured to decode and/or decrypt, via the DSP 1604 and/or processor(s) 1602, various signals received from one or more gateways, network devices, other access devices, cloud networks, and/or the like.

The access device 1600 may further include (and/or be in communication with) one or more non-transitory machine-readable storage mediums or storage devices (e.g., memory 1612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1612, such as RAM, ROM, FLASH, or disc drive, and executed by processor(s) 1602 or DSP 1604. The access device 1600 can also comprise software elements (e.g., located within the memory 1612), including, for example, an operating system, device drivers, executable libraries, and/or other code, such as one or more application programs, which may comprise computer programs implementing various functions. Memory 1612 may be a non-transitory machine-readable storage medium, processor-readable memory, and/or a computer-readable memory that stores the one or more computer-program products configured to cause the processor(s) 1602 and/or DSP 1604 to perform the various functions. In other embodiments, the various functions described may be performed in hardware.

Figure 17:
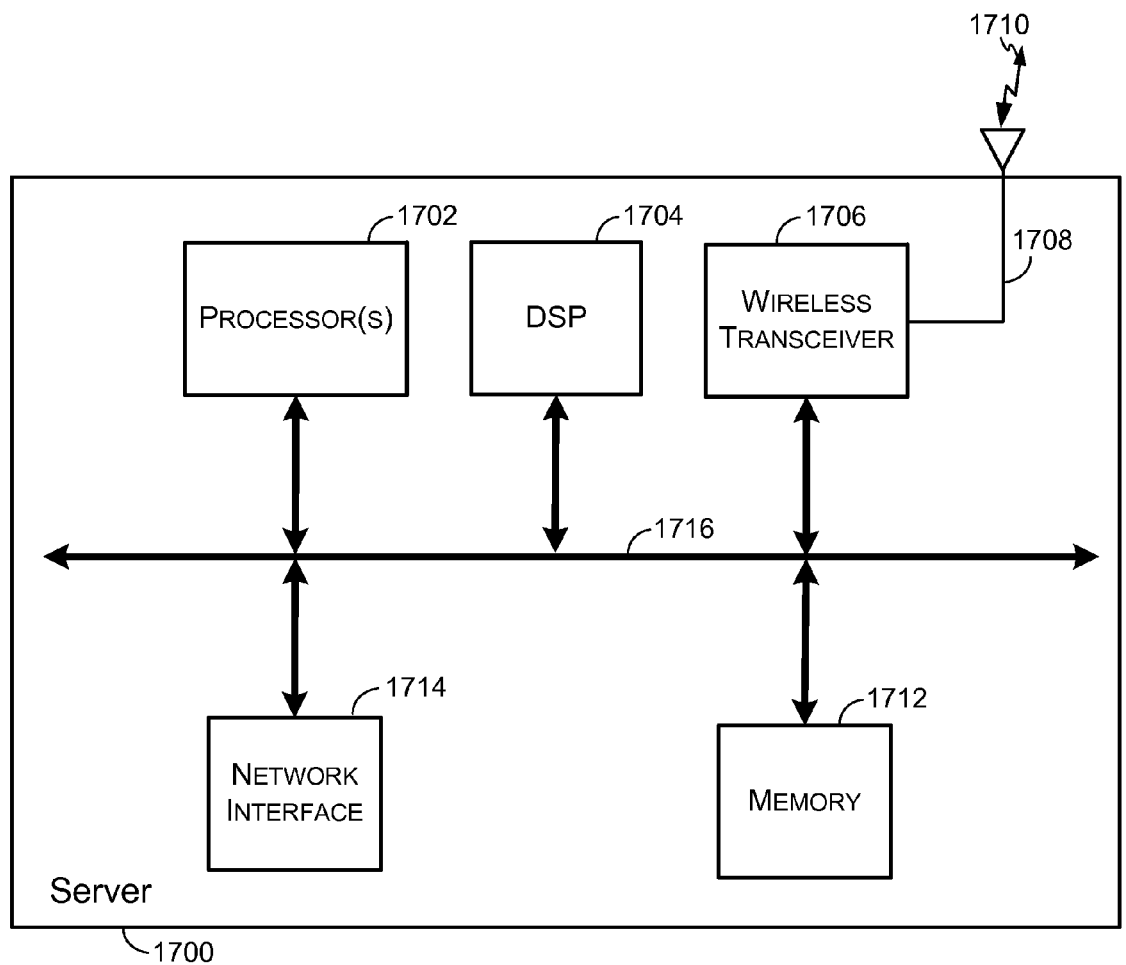
FIG. 17 is a block diagram illustrating an example of a server, in accordance with some embodiments.

FIG. 17 illustrates an example of a server 1700. The server 1700 includes hardware elements that can be electrically coupled via a bus 1716 (or may otherwise be in communication, as appropriate). In one embodiment, the bus 1716 can be used for the processor(s) 1702 to communicate between cores and/or with the memory 1712. The hardware elements may include one or more processors 1702, including without limitation one or more general-purpose processors and/or one or more special-purpose processors (such as digital signal processing chips, graphics acceleration processors, and/or the like), memory 1712, DSP 1704, a wireless transceiver 1706, a bus 1716, and antenna 1708. Furthermore, in addition to the wireless transceiver 1706, server 1700 can further include a network interface 1714 to communicate with a network (e.g., a local area network, a network of a preferred carrier, Internet, etc.).

The server 1700 may further include (and/or be in communication with) one or more non-transitory machine-readable storage mediums or storage devices (e.g., memory 1712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1712. The server 1700 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory 1712 may be a non-transitory machine-readable storage medium, processor-readable memory, and/or a computer-readable memory that stores the one or more computer-program products configured to cause the processor(s) 1702 to perform the functions described. In other embodiments, one or more of the functions described may be performed in hardware.

A set of these instructions and/or code might be stored on a non-transitory machine-readable storage medium, such as the memory 1712. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1700 and/or might take the form of source and/or installable code, which, upon compilation and/or installation on the server 1700 (e.g., using any of a variety of generally available compilers, installation programs, compression/decompression utilities, etc.) then takes the form of executable code.

Figure 18:
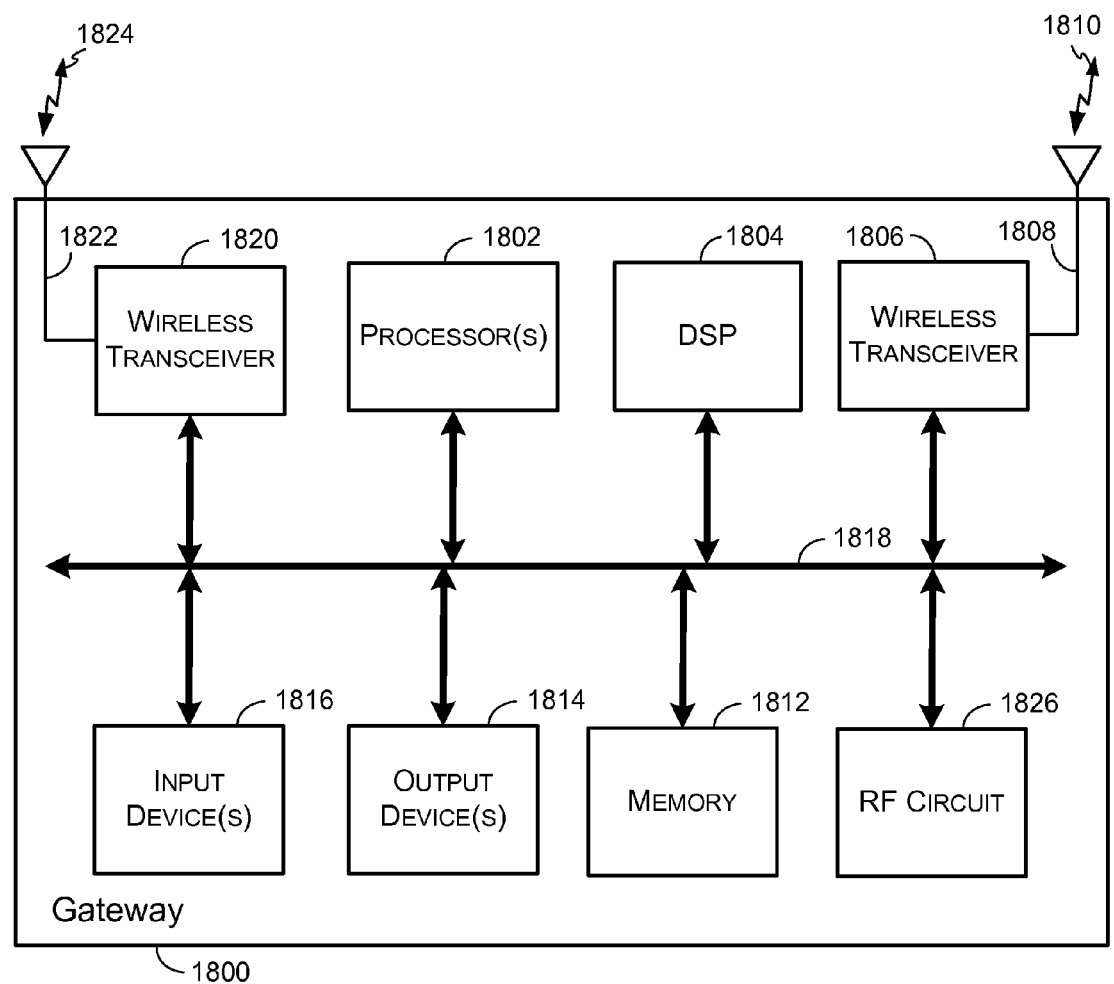
FIG. 18 is a block diagram illustrating an example of a gateway, in accordance with some embodiments.

FIG. 18 illustrates an example of a gateway 1800. The gateway 1800 may include a range extending device, a router, an access point, a modem, and/or any other device that provides network access among one or more computing devices and/or external networks. For example, the gateway 1800 may include a router gateway with access point and router functionality, and may further include an Ethernet switch and/or a modem. As another example, the gateway 1800 may include a range extending gateway that may be used to improve signal range and strength within a network by taking an existing signal from another gateway (e.g., a router gateway, an access point, or the like) and rebroadcasting the signal to create a second logical network.

The gateway 1800 includes hardware elements that can be electrically coupled via a bus 1818 (or may otherwise be in communication, as appropriate). In one embodiment, the bus 1818 can be used for the processor(s) 1802 to communicate between cores and/or with the memory 1812. The hardware elements may include one or more processors 1802, including without limitation one or more general-purpose processors and/or one or more special-purpose processors (such as digital signal processing chips, graphics acceleration processors, and/or the like); one or more input devices 1816, which can include without limitation one or more buttons, a keyboard, a keypad, a touch sensitive screen, a touch pad, and/or the like; and one or more output devices 1814, which can include, without limitation, a display, light or sound indicators, and/or the like.

The gateway 1800 may include one or more wireless transceivers 1806 and 1820 connected to the bus 1818. The wireless transceiver 1806 may be operable to receive wireless signals (e.g., a wireless signal 1810) via an antenna 1808. The wireless transceivers 1820 may be operable to receive wireless signals (e.g., a wireless signal 1814) via an antenna 1822. The wireless transceivers 1806 and 1820 may each include a WiFi transceiver radio designed to transmit and receive signals using frequencies of a specific frequency band, which may be referred to herein as "WiFi circuits." For example, wireless transceiver 1806 may include a 2.4 GHz WiFi circuit, and wireless transceiver 1820 may include a 5 GHz WiFi circuit. Accordingly, the gateway 1800 may include a single WiFi circuit for a first WiFi frequency band, and a single WiFi circuit for a second WiFi frequency band. In some embodiments, the gateway 1800 may include multiple wireless transceivers (not shown) for each available frequency band. The antennas 1808 and 1822 may include multiple band antennas that can transmit and/or receive signals over different frequency bands.

The gateway 1800 may further include radio frequency (RF) circuit 1826. In some embodiments, the wireless transceivers 1806 and 1820 may be integrated with or coupled to the RF circuit 1826 so that the RF circuit 1826 includes the wireless transceivers 1806 and 1820. In some embodiments, the wireless transceivers 1806 and 1820 and the RF circuit 1826 are separate components. The RF circuit 1826 may include a RF amplifier that may amplify signals received over antennas 1808 and 1822. The RF circuit 1826 may also include a power controller that may be used to adjust signal amplification by the RF amplifier. The power controller may be implemented using hardware, firmware, software, or any combination thereof.

The wireless signals 1810 and 1824 may be transmitted via a wireless network. In some embodiments, the wireless network may be any wireless network including but not limited to a wireless local area network (e.g., local area network 170), such as WiFi™, a Personal Access Network (PAN), such as Bluetooth®, Zigbee®, or UWB, or a wide area network, such as a cellular network (e.g. a GSM, WCDMA, LTE, CDMA2000 network), a cloud network, the Internet, or other network. Wireless transceivers 1806 and 1820 may be configured to receive various radio frequency (RF) signals (e.g., signals 1810 and 1824) via antennas 1808 and 1824, respectively, from one or more other gateways, access devices, network devices, cloud networks, and/or the like. Gateway 1800 may also be configured to decode and/or decrypt, via the DSP 1804 and/or processor(s) 1802, various signals received from one or more gateways, network devices, cloud networks, and/or the like.

The gateway 1800 may include a power supply (not shown) that can power the various components of the gateway 1800. The power supply may include a switch-mode power supply, a linear power supply, a push-pull power supply, or any other suitable type of power supply. In some embodiments, the gateway 1800 may include multiple power supplies. For example, a switch-mode power supply may be used to condition input power, and a linear power supply may be used to power the RF circuit 1826. The power supply may be configured to operate over various ranges of appropriate input voltages.

The gateway 1800 may further include (and/or be in communication with) one or more non-transitory machine-readable storage mediums or storage devices (e.g., memory 1812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1812, such as RAM, ROM, FLASH, or disc drive, and executed by processor(s) 1802 or DSP 1804. The gateway 1800 can also comprise software elements (e.g., located within the memory 1812), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. , may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. . The memory 1812 may be a non-transitory machine-readable storage medium, processor-readable memory, and/or a computer-readable memory that stores the one or more computer-program products configured to cause the processor(s) 1802 to perform the functions described. In other embodiments, one or more of the functions described may be performed in hardware.

A set of these instructions and/or code might be stored on a non-transitory machine-readable storage medium, such as the memory 1812. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 1800 and/or might take the form of source and/or installable code, which, upon compilation and/or installation on the gateway 1800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method for detecting suspicious network device activity, the method comprising:
    identifying, at an evaluating network device, a suspicious activity condition, wherein the suspicious activity condition relates to a normal activity parameter identified based on monitored activity of a monitored network device, and wherein evaluation of the condition includes evaluating network-device activity data;
    receiving, at the evaluating network device and from each of one or more other network devices, a communication that includes data corresponding to activity of a suspect network device, wherein:
        the network device and each of the one or more other network devices are part of a same network;
        the monitored network device and the suspect network device are different devices; and
        the same network is configured to facilitate reciprocal monitoring of network-device activity amongst network devices in the same network;
    determining, at the evaluating network device, that the suspicious activity condition is satisfied based on the data received from the one or more other network devices, wherein the determination indicates that a suspect network device in the same network is operating in a manner that does not conform with the normal activity parameter; and
    in response to the determination that the suspicious activity condition is satisfied, facilitating a change in operation of at least one network device in the same network, wherein the change in operation includes triggering each network device of the at least one network device to backup data stored at a location at the network device to a different location at the network device or to another network device on the same network.

2. The computer-implemented method as recited in claim 1, wherein the normal activity parameter corresponds to a transmission frequency or resource usage.

3. The computer-implemented method as recited in claim 1, further comprising:
  detecting, at the network device, activity of the network device, wherein the determining that the suspicious activity condition is satisfied is further based on the detected activity of the network device.

4. The computer-implemented method as recited in claim 1, wherein the evaluating device is the suspect network device.

5. The computer-implemented method as recited in claim 1, wherein the normal activity parameter relates to a device setting at the monitored network device, a communication received at the monitored network device or a sensor reading collected at the monitored device.

6. The computer-implemented method as recited in claim 1, wherein the facilitating a change in operation of the at least one network device includes transmitting an alert communication.

7. The computer-implemented method as recited in claim 1, wherein each the monitored activity and the data included in the received communications is of a same type of data.

8. The computer-implemented method as recited in claim 1, wherein the normal activity parameter includes a threshold, and the determining that the suspicious activity condition is satisfied includes determining that a value in the data exceeds the threshold.

9. The computer-implemented method as recited in claim 1, wherein changing the operation includes implementing a new operation, ceasing implementation of an existing operation or inhibiting transmission from the network device to another network device on the same network.

10. The computer-implemented method as recited in claim 1, further comprising:
  localizing a source part of the same network having operated in a manner to have caused the suspicious activity condition to have been determined to be satisfied.

11. A system, comprising:
  one or more data processors; and
  a non-transitory computer-readable storage medium containing instructions which when executed on the one or more data processors, cause the one or more processors to perform actions including:
    identifying a suspicious activity condition, wherein the suspicious activity condition relates to a normal activity parameter identified based on monitored activity of a monitored network device, and wherein evaluation of the condition includes evaluating network-device activity data;
    receiving, from each of one or more other network devices, a communication that includes data corresponding to activity of a suspect network device, wherein:
      the network device and each of the one or more other network devices are part of a same network;
      the monitored network device and the suspect network device are different devices; and
      the same network is configured to facilitate reciprocal monitoring of network-device activity amongst network devices in the same network;
    determining that the suspicious activity condition is satisfied based on the data received from the one or more other network devices, wherein the determination indicates that a suspect network device in the same network is operating in a manner that does not conform with the normal activity parameter; and
    in response to the determination that the suspicious activity condition is satisfied, facilitating a change in operation of at least one network device in the same network, wherein the change in operation includes triggering each network device of the at least one network device to backup data stored at a location at the network device to a different location at the network device or to another network device on the same network.

12. The system as recited in claim 11, wherein the normal activity parameter corresponds to a transmission frequency or resource usage.

13. The system as recited in claim 11, wherein the actions further include:
  detecting, at the network device, activity of the network device, wherein the determining that the suspicious activity condition is satisfied is further based on the detected activity of the network device.

14. The system as recited in claim 11, wherein the system includes the suspect network device.

15. The system as recited in claim 11, wherein the normal activity parameter relates to a device setting at the monitored network device, a communication received at the monitored network device or a sensor reading collected at the monitored device.

16. The system as recited in claim 11, wherein the facilitating a change in operation of the at least one network device includes transmitting an alert communication.

17. The system as recited in claim 11, wherein each the monitored activity and the data included in the received communications is of a same type of data.

18. The system as recited in claim 11, wherein the normal activity parameter includes a threshold, and the determining that the suspicious activity condition is satisfied includes determining that a value in the data exceeds the threshold.

19. The system as recited in claim 11, wherein changing the operation includes implementing a new operation, ceasing implementation of an existing operation or inhibiting transmission from the network device to another network device on the same network.

20. The system as recited in claim 11, wherein the actions further include:
  localizing a source part of the same network having operated in a manner to have caused the suspicious activity condition to have been determined to be satisfied.

21. A computer-program product tangibly embodied in a non-transitory machine-readable storage medium, including instructions configured to cause a data processing apparatus of a network device to perform actions including:
  identifying a suspicious activity condition, wherein the suspicious activity condition relates to a normal activity parameter identified based on monitored activity of a monitored network device, and wherein evaluation of the condition includes evaluating network-device activity data;
  receiving, from each of one or more other network devices, a communication that includes data corresponding to activity of a suspect network device, wherein:
    the network device and each of the one or more other network devices are part of a same network;
    the monitored network device and the suspect network device are different devices; and
    the same network is configured to facilitate reciprocal monitoring of network-device activity amongst network devices in the same network;
  determining that the suspicious activity condition is satisfied based on the data received from the one or more other network devices, wherein the determination indicates that a suspect network device in the same network is operating in a manner that does not conform with the normal activity parameter; and in response to the determination that the suspicious activity condition is satisfied, facilitating a change in operation of at least one network device in the same network, wherein the change in operation includes triggering each network device of the at least one network device to backup data stored at a location at the network device to a different location at the network device or to another network device on the same network.

22. The computer-program product as recited in claim 21, wherein the normal activity parameter corresponds to a transmission frequency or resource usage.

23. The computer-program product as recited in claim 21, wherein the actions further include:
    detecting activity of the network device, wherein the determining that the suspicious activity condition is satisfied is further based on the detected activity of the network device.

24. The computer-program product as recited in claim 21, wherein the normal activity parameter relates to a device setting at the monitored network device, a communication received at the monitored network device or a sensor reading collected at the monitored device.

25. The computer-program product as recited in claim 21, wherein the facilitating a change in operation of the at least one network device includes transmitting an alert communication.

26. The computer-program product as recited in claim 21, wherein each the monitored activity and the data included in the received communications is of a same type of data.

27. The computer-program product as recited in claim 21, wherein the normal activity parameter includes a threshold, and the determining that the suspicious activity condition is satisfied includes determining that a value in the data exceeds the threshold.

28. The computer-program product as recited in claim 21, wherein changing the operation includes implementing a new operation, ceasing implementation of an existing operation or inhibiting transmission from the network device to another network device on the same network.

29. The computer-program product as recited in claim 21, further comprising:
    localizing a source part of the same network having operated in a manner to have caused the suspicious activity condition to have been determined to be satisfied.

* * * * *